United States Patent
Tanaka et al.

(10) Patent No.: US 11,418,711 B2
(45) Date of Patent: Aug. 16, 2022

(54) LENS INTERCHANGEABLE DIGITAL CAMERA, AND OPERATION METHOD AND OPERATION PROGRAM THEREOF

(71) Applicant: FUJIFILM Corporation, Tokyo (JP)

(72) Inventors: Koichi Tanaka, Saitama (JP); Akihiro Uchida, Saitama (JP); Kenkichi Hayashi, Saitama (JP); Seiichi Izawa, Saitama (JP); Hideo Kobayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/382,804

(22) Filed: Jul. 22, 2021

(65) Prior Publication Data

US 2021/0352199 A1 Nov. 11, 2021

Related U.S. Application Data

(63) Continuation of application No. 16/830,336, filed on Mar. 26, 2020, now Pat. No. 11,115,593, which is a
(Continued)

(30) Foreign Application Priority Data

Sep. 29, 2017 (JP) .............................. JP2017-189506

(51) Int. Cl.
  *H04N 5/232* (2006.01)
  *G03B 17/14* (2021.01)
(52) U.S. Cl.
  CPC ........... *H04N 5/2328* (2013.01); *G03B 17/14* (2013.01); *H04N 5/23209* (2013.01); *H04N 5/23287* (2013.01)
(58) Field of Classification Search
  CPC ........... H04N 5/23209; H04N 5/23287; H04N 5/23245; H04N 5/2328; H04N 5/2325;
(Continued)

(56) References Cited

U.S. PATENT DOCUMENTS

2009/0160956 A1* 6/2009 Yumiki .............. H04N 5/23258
  348/208.11
2016/0165111 A1* 6/2016 Uemura ............... G02B 27/646
  348/208.11
2018/0033121 A1 2/2018 Ida

FOREIGN PATENT DOCUMENTS

| JP | 2004040298 A | 2/2004 |
| JP | 2005269130 A | 9/2005 |
| JP | 2017011571 A | 1/2017 |

OTHER PUBLICATIONS

International Search Report issued in PCT/JP2018/035885; dated Nov. 13, 2018.
(Continued)

*Primary Examiner* — Nelson D. Hernández Hernández
(74) *Attorney, Agent, or Firm* — Studebaker & Brackett PC

(57) ABSTRACT

The lens interchangeable digital camera includes a sensor movement type shake correction mechanism that performs a sensor movement operation of moving an image sensor in a direction to cancel a shake. A characteristic data acquisition unit acquires optical characteristic data corresponding to optical characteristics of an imaging optical system of a lens unit mounted on a body mount. A determination unit determines whether or not adaptive optical characteristic data that can be handled by an image correction unit that performs image correction based on the optical characteristic data can be acquired. An operation deciding unit prohibits a shift operation which is at least a part of a sensor movement operation in an uncorrectable state where the image correction based on the adaptive optical characteristic data is not possible since the adaptive optical characteristic data cannot be acquired.

16 Claims, 26 Drawing Sheets

Related U.S. Application Data continuation of application No. PCT/JP2018/035885, filed on Sep. 27, 2018.

(58) Field of Classification Search
CPC ... G03B 17/14; G03B 2205/0007; G03B 5/00
See application file for complete search history.

(56) References Cited

OTHER PUBLICATIONS

International Preliminary Report on Patentability and Written Opinion issued in PCT/JP2018/035885; dated Mar. 31, 2020.

* cited by examiner

FIG. 10

| ACQUISITION RESULT INFORMATION | |
|---|---|
| COMMUNICATION AVAILABILITY | ENABLE |
| RECEPTION PRESENCE OR ABSENCE | PRESENT |
| EDGE PART DIMMING DATA | |
| DISTORTION DATA | |
| RESOLUTION DATA | |
| PUPIL SHAPE DATA | |

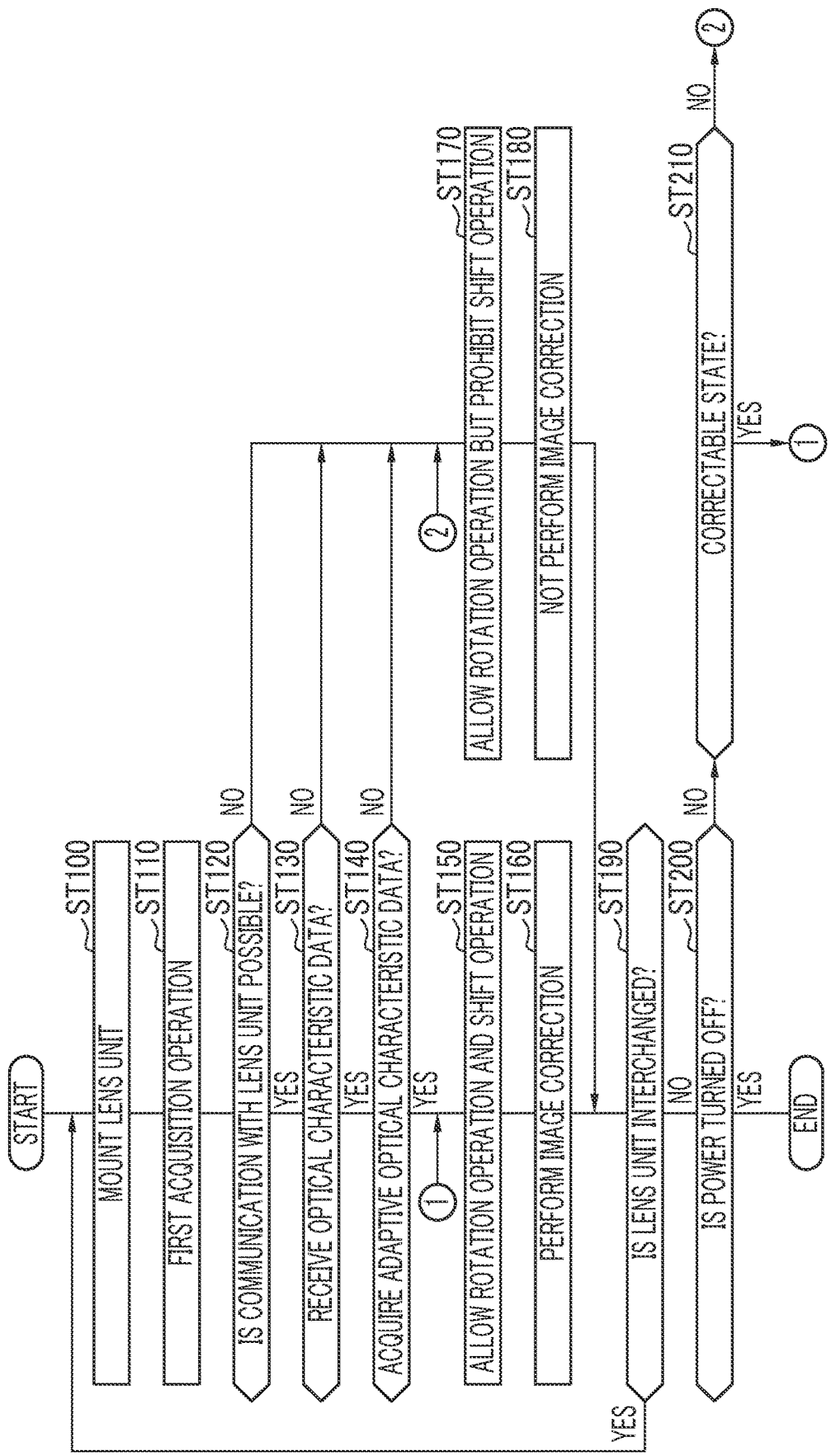

FIG. 15

| DETERMINATION RESULT INFORMATION | CORRECTABLE | UNCORRECTABLE |
|---|---|---|
| | ⇩ | ⇩ |
| | OPERATION DECIDING RESULT INFORMATION A | OPERATION DECIDING RESULT INFORMATION C |
| ROTATION OPERATION | ALLOW | OPERATION PROHIBITION |
| SHIFT OPERATION | ALLOW | OPERATION PROHIBITION |

FIG. 16

| DETERMINATION RESULT INFORMATION | CORRECTABLE | UNCORRECTABLE |
|---|---|---|
| | ⇩ | ⇩ |
| | OPERATION DECIDING RESULT INFORMATION A | OPERATION DECIDING RESULT INFORMATION D |
| ROTATION OPERATION | ALLOW | ALLOW |
| SHIFT OPERATION | ALLOW | RANGE RESTRICTION |

LENS INTERCHANGEABLE DIGITAL CAMERA, AND OPERATION METHOD AND OPERATION PROGRAM THEREOF

CROSS-REFERENCE TO RELATED APPLICATIONS

This application is a Continuation of U.S. patent application Ser. No. 16/830,336 filed on 26 Mar. 2020, which is a Continuation of PCT International Application No. PCT/JP2018/035885 filed on 27 Sep. 2018, which claims priority under 35 U.S.C. § 119(a) to Japanese Patent Application No. 2017-189506 filed on 29 Sep. 2017. The above application is hereby expressly incorporated by reference, in its entirety, into the present application.

BACKGROUND OF THE INVENTION

1. Field of the Invention

The present invention relates to a lens interchangeable digital camera, and an operation method and an operation program thereof.

2. Description of the Related Art

A digital camera comprising an image sensor that outputs image data of a subject is widely used. The digital camera comprises a live view display function of displaying a captured image of the subject represented by the image data on a display unit such as a liquid crystal display in real time. The digital camera also comprises a shake correction mechanism that cancels the influence of a shake occurring in a case where a user does not hold the camera in a stable and correct manner or in a case where the camera is installed on a vehicle such as a car or a ship.

There are two types of shake correction mechanism. One is a lens movement type. The lens movement type performs a lens movement operation of moving a correction lens in a direction to cancel the shake. The correction lens is a part of a plurality of lenses constituting an imaging optical system for forming a subject image on an imaging surface of the image sensor.

The other type of the shake correction mechanism is a sensor movement type. The sensor movement type performs a sensor movement operation of moving the image sensor instead of the correction lens in the lens movement type.

In the sensor movement type, the image sensor is moved with respect to the imaging optical system by the sensor movement operation. Therefore, an optical center and an image center may be shifted. More specifically, the sensor movement operation includes a rotation operation of rotationally moving the image sensor in a state where the optical center matches the image center and a shift operation of moving the image sensor parallel to a plane perpendicular to an optical axis of the imaging optical system. The optical center and the image center do not shift in the rotation operation, but are shifted in the shift operation.

By the way, the digital camera includes a so-called lens interchangeable digital camera in which a lens unit with a built-in imaging optical system is interchangeable according to imaging usage. The lens has optical characteristics such as edge part dimming (also referred to as shading) and distortion aberration (also referred to as distortion). Such optical characteristics cause deterioration in image quality as well as shake. For this reason, the lens interchangeable digital camera is provided with an image correction unit that performs image correction on the image data according to the optical characteristics of the imaging optical system of the lens unit, in addition to the above shake correction mechanism.

JP2017-011571A describes a lens interchangeable digital camera equipped with a lens unit comprising a lens movement type shake correction mechanism and comprising an image correction unit that performs image correction according to optical characteristics. The image correction unit performs the image correction based on optical characteristic data corresponding to the optical characteristics (denoted as parameters or the like necessary for correction in JP2017-011571A). The optical characteristic data is stored in, for example, a storage unit (hereinafter unit-side storage unit) built in the lens unit, and the lens interchangeable digital camera acquires the optical characteristic data to be transmitted from the unit-side storage unit.

SUMMARY OF THE INVENTION

However, there may be a lens unit that does not have the unit-side storage unit in the first place, or there may be a case where a lens unit has the unit-side storage unit and stores optical characteristic data, but the image correction unit on the digital camera side cannot handle the optical characteristic data. In addition, even in a case where a lens unit has the unit-side storage unit and the image correction unit can handle the optical characteristic data of the unit-side storage unit, there may be a case where the optical characteristic data from the unit-side storage unit cannot be received on the digital camera side since communication between the lens unit and the digital camera does not work well. In a case where the optical characteristic data that is necessary for the image correction and can be handled by the image correction unit cannot be acquired on the digital camera side for these various reasons, needless to say, it is not possible to perform the image correction by the image correction unit. In the following, the optical characteristic data that can be handled by the image correction unit is referred to as adaptive optical characteristic data.

Here, a case where a sensor movement type shake correction mechanism is provided in the lens interchangeable digital camera described in JP2017-011571A is considered. In the case, in a case where the sensor movement type shake correction mechanism is operated, the optical center and the image center are shifted. In addition, in a case where the adaptive optical characteristic data cannot be acquired, it is not possible to perform the image correction by the image correction unit. In such a case, the optical center and the image center are shifted and the image correction cannot be performed. Therefore, for example, the shift between the optical center and the image center becomes noticeable due to the optical characteristics in a captured image of the live view display. More specifically, a degree of image deterioration caused by the optical characteristics also changes with time due to a time change of the shift between the optical center and the image center in the captured image of the live view display. For this reason, a user who observes the scene may feel a large sense of discomfort.

An object of the present invention is to provide a lens interchangeable digital camera, and an operation method and an operation program thereof without causing a user a sense of discomfort.

In order to solve the above problems, a lens interchangeable digital camera according to the present invention comprises an image sensor, a sensor movement type shake correction mechanism, a body mount, an acquisition unit, an image correction unit, a determination unit, and an operation deciding unit. The image sensor outputs image data of a subject. The sensor movement type shake correction mechanism performs a sensor movement operation of moving the image sensor in a direction to cancel a shake. A plurality of types of lens units with built-in imaging optical systems for forming a subject image on an imaging surface of the image sensor are interchangeably mounted on the body mount. The acquisition unit acquires optical characteristic data corresponding to optical characteristics of the imaging optical system of the lens unit mounted in the body mount. The image correction unit performs image correction on the image data based on the optical characteristic data. The determination unit determines whether or not the acquisition unit is able to acquire adaptive optical characteristic data that is the optical characteristic data and is able to be handled by the image correction unit. The operation deciding unit decides an operation of the shake correction mechanism according to a determination result of the determination unit and restricts at least a part of the sensor movement operation allowed in a correctable state where the image correction based on the adaptive optical characteristic data is possible in an uncorrectable state where the image correction based on the adaptive optical characteristic data is not possible since the acquisition unit is not able to acquire the adaptive optical characteristic data.

It is preferable that the sensor movement operation includes a plurality of types of sensor movement operations having different movement directions of the image sensor, and the operation deciding unit restricts at least one of the plurality of types of sensor movement operations.

It is preferable that the plurality of types of sensor movement operations include a rotation operation of rotationally moving the image sensor in a state where an optical center which is a point through which an optical axis of the imaging optical system passes matches an image center which is a center point of the imaging surface and a shift operation of moving the image sensor in parallel with a plane perpendicular to the optical axis, and the operation deciding unit restricts at least the shift operation.

It is preferable that the operation deciding unit allows the rotation operation regardless of the correctable state or the uncorrectable state.

It is preferable that the restriction decided by the operation deciding unit in the uncorrectable state includes an operation prohibition that prohibits the sensor movement operation.

It is preferable that the restriction decided by the operation deciding unit in the uncorrectable state includes a range restriction that restricts a movable range of the image sensor compared with a movable range in the correctable state.

It is preferable that the lens interchangeable digital camera has a live view display function of displaying a captured image of the subject represented by the image data in real time on a display unit, and the operation deciding unit restricts the sensor movement operation while the live view display function is in operation and releases the restriction of the sensor movement operation while the image sensor executes a main imaging operation of the captured image in response to a release operation, in the uncorrectable state.

It is preferable that the lens interchangeable digital camera has a video imaging function of imaging a video of the subject, and the operation deciding unit restricts the sensor movement operation while the video imaging function is in operation and releases the restriction of the sensor movement operation while the video imaging function is not in operation, in the uncorrectable state.

It is preferable that the acquisition unit performs at least one operation of a first acquisition operation of acquiring the optical characteristic data stored in a unit-side storage unit in the lens unit mounted on the body mount or a second acquisition operation of acquiring the optical characteristic data stored in a camera-side storage unit in a camera body.

It is preferable that the camera-side storage unit stores the optical characteristic data in association with identification information for identifying the lens unit, and the second acquisition operation is an operation of acquiring the identification information from the lens unit mounted on the body mount, and reading out and acquiring correspondence data which is the optical characteristic data corresponding to the acquired identification information from the camera-side storage unit.

It is preferable that the lens interchangeable digital camera has a data selection function of causing the user to select one piece of optical characteristic data from among the pieces of optical characteristic data stored in the camera-side storage unit, and the second acquisition operation is an operation of reading out and acquiring the optical characteristic data selected by the data selection function from the camera-side storage unit.

It is preferable that the correctable state is a case where the adaptive optical characteristic data is able to be acquired by any one of the first acquisition operation or the second acquisition operation, and the uncorrectable state is a case where the adaptive optical characteristic data is not able to be acquired by any one of the first acquisition operation or the second acquisition operation.

It is preferable that the case where the adaptive optical characteristic data is not able to be acquired by the first acquisition operation includes any one of a case where communication with the lens unit is not able to be performed, a case where the communication with the lens unit is able to be performed but the optical characteristic data is not able to be received from the lens unit, or a case where the optical characteristic data received from the lens unit is not the adaptive optical characteristic data.

It is preferable that the case where the adaptive optical characteristic data is not able to be acquired by the second acquisition operation includes a case where the correspondence data is not stored in the camera-side storage unit.

It is preferable that the case where the adaptive optical characteristic data is not able to be acquired by the second acquisition operation includes a case where the optical characteristic data is not selected by the data selection function.

It is preferable that the acquisition unit first performs the first acquisition operation, and performs the second acquisition operation in a case where the adaptive optical characteristic data is not able to be acquired by the first acquisition operation.

It is preferable that the acquisition unit reads out and acquires the correspondence data from the camera-side storage unit regardless of whether or not the adaptive optical characteristic data is in the unit-side storage unit in a case where the correspondence data is in the camera-side storage unit.

It is preferable that there are a plurality of types of optical characteristic data, and the correctable state is any one of a case where the acquisition unit is able to acquire the adaptive optical characteristic data of a specific type of optical characteristic data among the plurality of types of optical characteristic data or a case where the acquisition unit is able to acquire the adaptive optical characteristic data of all of the optical characteristic data of the plurality of types of optical characteristic data.

An operation method of a lens interchangeable digital camera according to the present invention comprises an acquisition step, an image correction step, a determination step, and an operation deciding step. The lens interchangeable digital camera comprises an image sensor that outputs image data of a subject, a sensor movement type shake correction mechanism that performs a sensor movement operation of moving the image sensor in a direction to cancel a shake, and a body mount in which a plurality of types of lens units with built-in imaging optical systems for forming a subject image on an imaging surface of the image sensor are interchangeably mounted. In the acquisition step, optical characteristic data corresponding to optical characteristics of the imaging optical system of the lens unit mounted in the body mount is acquired. In the image correction step, image correction on the image data based on the optical characteristic data is performed. In the determination step, it is determined whether or not the acquisition step is able to acquire adaptive optical characteristic data that is the optical characteristic data and is able to be handled in the image correction step. In the operation deciding step, an operation of the shake correction mechanism according to a determination result of the determination step is decided and at least a part of the sensor movement operation allowed in a correctable state where the image correction based on the adaptive optical characteristic data is possible in an uncorrectable state where the image correction based on the adaptive optical characteristic data is not possible since the acquisition step is not able to acquire the adaptive optical characteristic data is restricted.

An operation program of a lens interchangeable digital camera according to the present invention causes a computer to execute an acquisition function, an image correction function, a determination function, and an operation deciding function. The lens interchangeable digital camera comprises an image sensor that outputs image data of a subject, a sensor movement type shake correction mechanism that performs a sensor movement operation of moving the image sensor in a direction to cancel a shake, and a body mount in which a plurality of types of lens units with built-in imaging optical systems for forming a subject image on an imaging surface of the image sensor are interchangeably mounted. The acquisition function acquires optical characteristic data corresponding to optical characteristics of the imaging optical system of the lens unit mounted in the body mount. The image correction function performs image correction on the image data based on the optical characteristic data. The determination function determines whether or not the acquisition function is able to acquire adaptive optical characteristic data that is the optical characteristic data and is able to be handled by the image correction function. The operation deciding function decides an operation of the shake correction mechanism according to a determination result of the determination function and restricts at least a part of the sensor movement operation allowed in a correctable state where the image correction based on the adaptive optical characteristic data is possible in an uncorrectable state where the image correction based on the adaptive optical characteristic data is not possible since the acquisition function is not able to acquire the adaptive optical characteristic data.

The present invention can provide a lens interchangeable digital camera, and an operation method and an operation program thereof without causing a user a sense of discomfort since at least a part of the sensor movement operation of moving the image sensor in the direction to cancel the shake by the sensor movement type shake correction mechanism is restricted in the state where the adaptive optical characteristic data that is the optical characteristic data necessary for performing the image correction according to the optical characteristics of the imaging optical system of the lens unit and can be handled by the image correction unit cannot be acquired and thus the image correction cannot be performed.

BRIEF DESCRIPTION OF THE DRAWINGS

FIG. 10 is a table showing acquisition result information.

FIG. 14 is a flowchart showing a processing procedure of the lens interchangeable digital camera.

FIG. 15 is a table showing operation deciding result information for prohibiting also a rotation operation in a case of an uncorrectable state.

FIG. 16 is a table showing operation deciding result information for restricting a range of a shift operation in the case of the uncorrectable state.

DESCRIPTION OF THE PREFERRED EMBODIMENTS

First Embodiment

Figure 1:
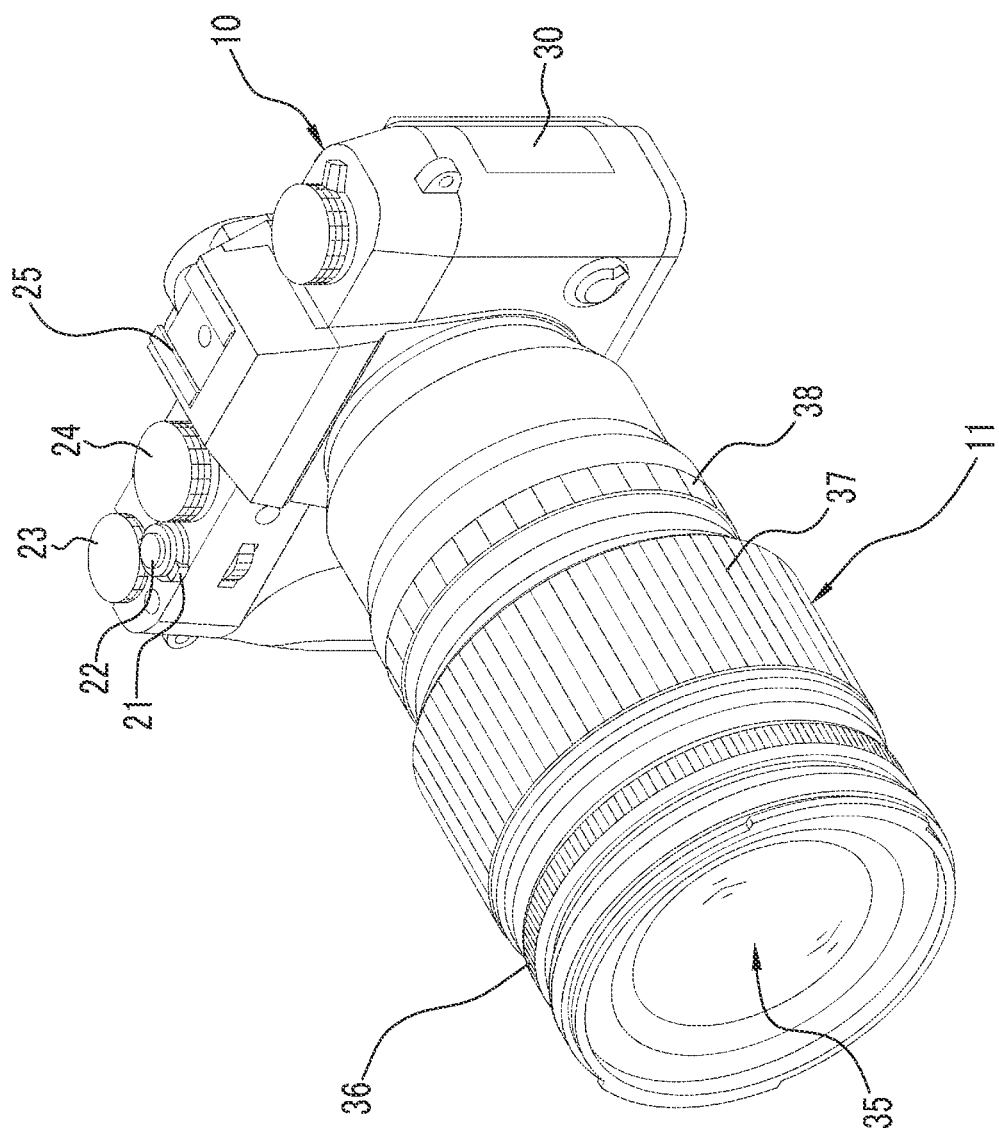
FIG. 1 is a front external perspective view of a lens interchangeable digital camera on which a lens unit is mounted.
Figure 2:
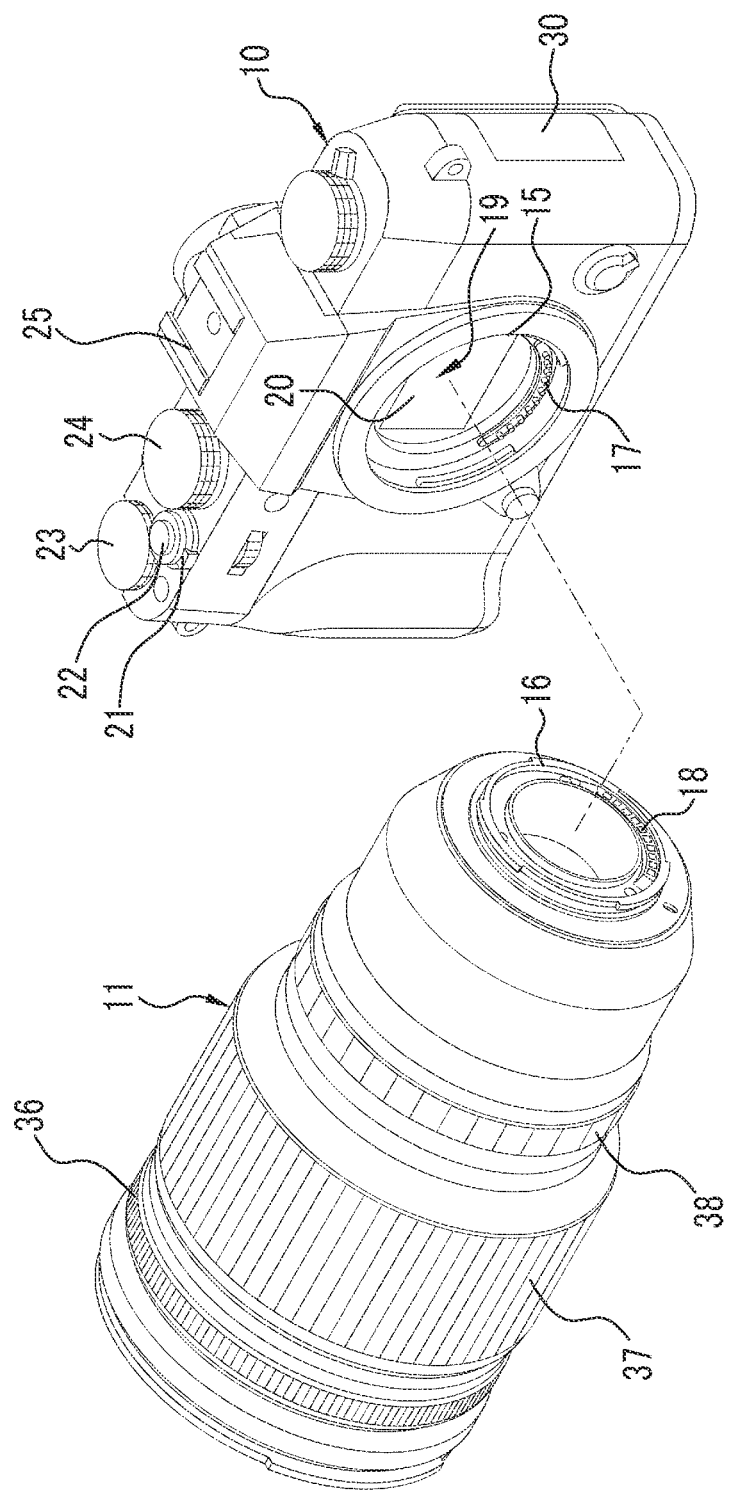
FIG. 2 is a front external perspective view of the lens interchangeable digital camera from which the lens unit is detached.
Figure 3:
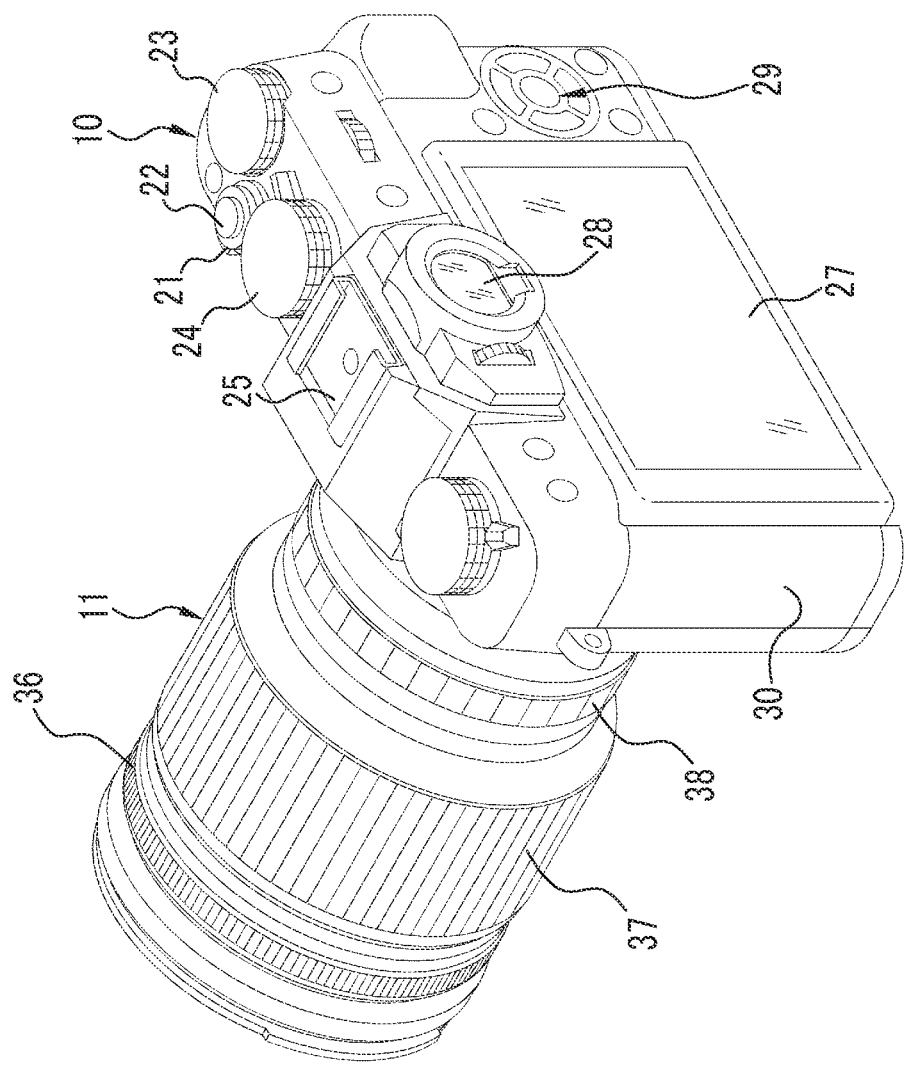
FIG. 3 is a rear external perspective view of the lens interchangeable digital camera on which a lens unit is mounted.

In FIGS. 1 to 3, a lens unit 11 is interchangeably mounted on a lens interchangeable digital camera (hereinafter simply referred to as a camera) 10. A body mount 15 which is a circular opening is provided on a front surface of the camera 10. On the other hand, an engaging portion 16 that engages with the body mount 15 is provided at a rear end of the lens unit 11. The engaging portion 16 is engaged with the body mount 15 to mount the lens unit 11 to the camera 10. FIGS. 1 and 3 show a state where the lens unit 11 is mounted on the camera 10, and FIG. 2 shows a state where the lens unit 11 is detached from the camera 10.

A plurality of signal contacts 17 are disposed on the body mount 15. Similarly, a plurality of signal contacts 18 are disposed on the engaging portion 16. In a case where the lens unit 11 is mounted on the camera 10, the signal contacts 17 and the signal contacts 18 are in contact with each other and are electrically connected. Communication between the camera 10 and the lens unit 11 becomes possible due to the connection between the signal contacts 17 and 18.

An image sensor 19 is mounted on the camera 10. The image sensor 19 is disposed on a deep side of the body mount 15. The image sensor 19 is, for example, a charge coupled device (CCD) type or a complementary metal oxide semiconductor (CMOS) type, and has a rectangular imaging surface 20. A plurality of pixels are arranged in a matrix on the imaging surface 20. The pixel photoelectrically converts a subject image formed on the imaging surface 20 and outputs an imaging signal which is a source of image data of the subject.

A power lever 21, a release switch 22, an exposure correction dial 23, a shutter speed/International Organization for Standardization (ISO) sensitivity dial 24, a hot shoe 25, and the like are provided on an upper surface of the camera 10.

The power lever 21 is operated in a case where power of the camera 10 is turned on and off. The release switch 22 is operated in a case where static image imaging is instructed or in a case where the start and the end of video imaging are instructed. The release switch 22 is a two-stage press type. In a case where the release switch 22 is pressed to a first stage (half-pressed), a well-known imaging preparation processing such as automatic focus adjustment or automatic exposure control is executed. In a case where the release switch 22 is pressed to a second stage (fully-pressed), the image sensor 19 is caused to execute a main imaging operation (an operation of accumulating electric charges in the pixels and outputting an imaging signal corresponding to the accumulated electric charges). Accordingly, imaging processing for recording image data output from the image sensor 19 as a captured image is executed. Hereinafter, the full press of the release switch 22 is referred to as a release operation.

The exposure correction dial 23 is operated in a case where an exposure value is corrected. The shutter speed/ISO sensitivity dial 24 is operated in a case where the shutter speed and ISO sensitivity are set. An external flash device is attachably and detachably mounted on the hot shoe 25.

A display unit 27, an optical viewfinder 28, an operation key group 29, and the like are provided on a rear surface of the camera 10. The display unit 27 is composed of a liquid crystal display, for example. The display unit 27 performs so-called live view display in which the captured image of the subject represented by the image data from the image sensor 19 is displayed in real time. This live view display function is temporarily stopped during the imaging processing accompanying the release operation and resumed after the imaging processing ends. In addition to the live view display, the display unit 27 performs playback display of a recorded captured image or display of various setting screens. The optical viewfinder 28 displays a subject image formed through the lens unit 11 and a pentaprism (not shown). The operation key group 29 is operated in a case where various settings are performed on the various setting screens (refer to FIG. 27). A portion indicated by a reference numeral 30 in FIGS. 1 to 3 is a cover that covers a memory card slot on which a memory card 77 (refer to FIG. 7) is attachably and detachably mounted.

An imaging optical system 35 is built in the lens unit 11. The imaging optical system 35 forms a subject image on the imaging surface 20 of the image sensor 19. Various operation rings such as a focus ring 36, a zoom ring 37, and an iris ring 38 are mounted on the outer periphery of the lens unit 11. The above rings are rotatable along a circumferential direction. The focus ring 36 is operated during manual focus adjustment, the zoom ring 37 is operated during zooming, and the iris ring 38 is operated in a case where an opening of an aperture stop formed by a stop mechanism 46 is set (refer to FIG. 4).

Figure 4:
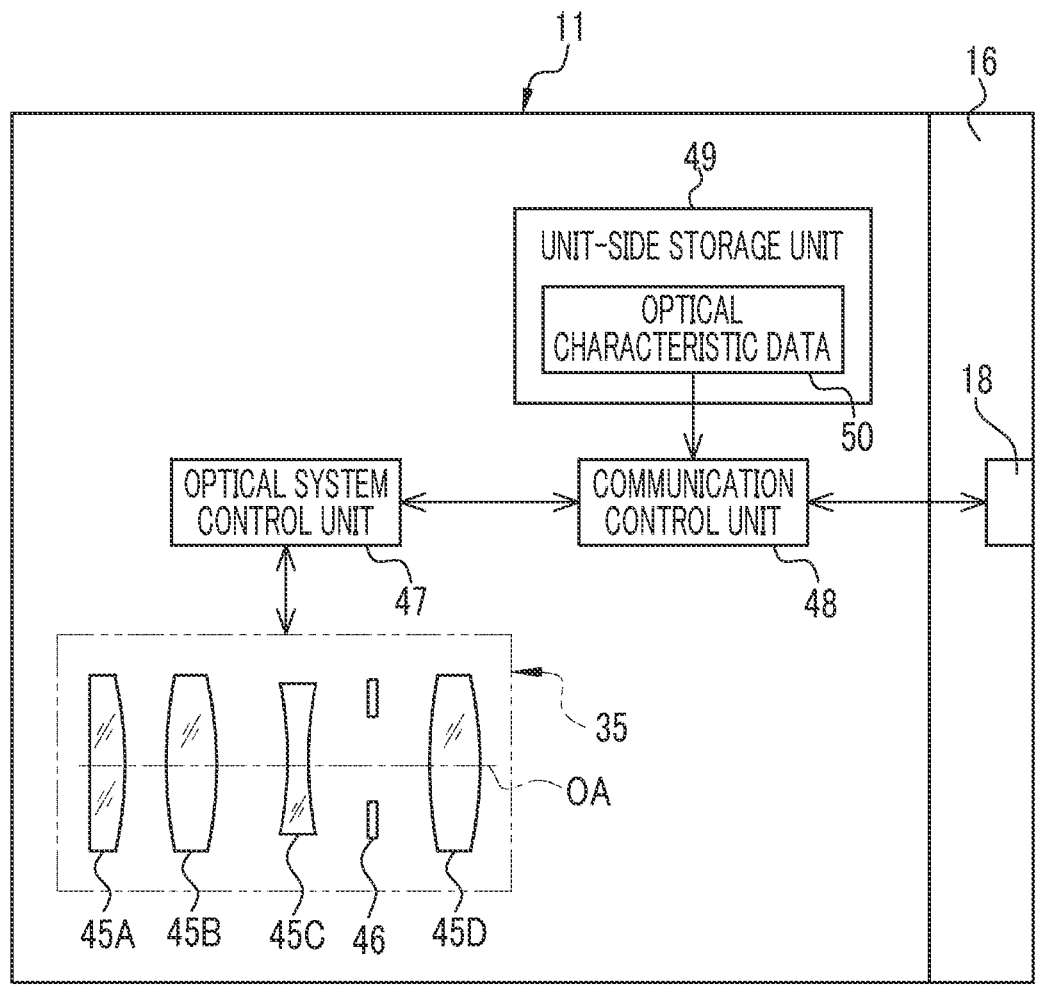
FIG. 4 is a block diagram of the lens unit.

As shown in FIG. 4, the imaging optical system 35 comprises, for example, a plurality of lenses 45A, 45B, 45C, and 45D and the stop mechanism 46. The lens 45A is a lens disposed at the forefront (subject side) of the imaging optical system 35, and the lens 45D is a lens disposed at the rearmost (image sensor 19 side) of the imaging optical system 35. The focus lens 45B for the focus adjustment and the zoom lens 45C for the zooming are disposed between the lenses 45A and 45D. As is well known, the stop mechanism 46 has a plurality of stop leaf blades. The stop leaf blades form a substantially circular aperture stop and change a size of the aperture stop to restrict an amount of incidence ray.

The focus lens 45B moves along an optical axis OA in response to an operation of the focus ring 36. The zoom lens 45C moves along the optical axis OA in response to an operation of the zoom ring 37.

An actuator such as a motor and a position detection sensor that detects a position on the optical axis OA are connected to the focus lens 45B. An optical system control unit 47 operates the actuator to move the focus lens 45B along the optical axis OA while checking the position of the focus lens 45B on the optical axis OA based on a detection result of the position detection sensor during the automatic focus adjustment.

The stop mechanism 46 is also connected with an actuator such as a motor for opening and closing the stop leaf blades and an opening detection sensor for detecting the opening of the aperture stop. The optical system control unit 47 operates the actuator to open and close the stop leaf blades while checking the opening of the aperture stop based on a detection result of the opening detection sensor. The optical system control unit 47 opens and closes the stop leaf blades such that an opening calculated on the camera 10 side is obtained during the automatic exposure control. Except during the automatic exposure control, the stop leaf blades are opened and closed such that an opening set by the iris ring 38 is obtained.

The position detection sensor for detecting the position on the optical axis OA is connected to the zoom lens 45C, but an actuator such as the motor is not connected thereto. That is, the zoom lens 45C moves along the optical axis OA only in the case of the manual operation of the zoom ring 37. The actuator such as the motor may be connected to the zoom lens 45C such that the optical system control unit 47 can be electrically controlled.

A communication control unit 48 controls communication with the camera 10 through the signal contacts 18 of the engaging portion 16. The optical system control unit 47 is connected to the communication control unit 48. The communication control unit 48 outputs various types of information, such as the position of the focus lens 45B in the automatic focus adjustment or the calculation result of the opening of the aperture stop in the automatic exposure control, to be transmitted from the camera 10 side to the optical system control unit 47. The optical system control unit 47 operates the actuator to adjust the position of the focus lens 45B or the opening of the aperture stop based on the various types of information from the communication control unit 48.

In addition, a unit-side storage unit 49 is connected to the communication control unit 48. The unit-side storage unit 49 stores optical characteristic data 50 corresponding to optical characteristics of the imaging optical system 35. The communication control unit 48 reads out the optical characteristic data 50 from the unit-side storage unit 49 in response to a transmission request for the optical characteristic data 50 from the camera 10 and transmits the read optical characteristic data 50 to the camera 10.

Figure 5:
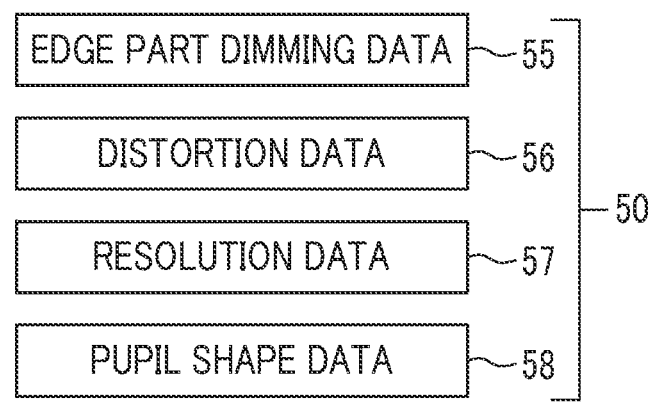
FIG. 5 is a diagram showing types of optical characteristic data.

In FIG. 5, there are four types of optical characteristic data 50 of edge part dimming data 55, distortion data 56, resolution (sharpness) data 57, and pupil shape data 58. These pieces of data 55 to 58 change according to an image height with reference to an optical center OC (refer to FIG. 8) which is a point through which the optical axis OA of the imaging optical system 35 passes. For example, the edge part dimming data 55 has characteristics that the optical center OC has the largest transmitted light amount and the transmitted light amount decreases as the image height increases (away from the optical center OC).

Figure 6:
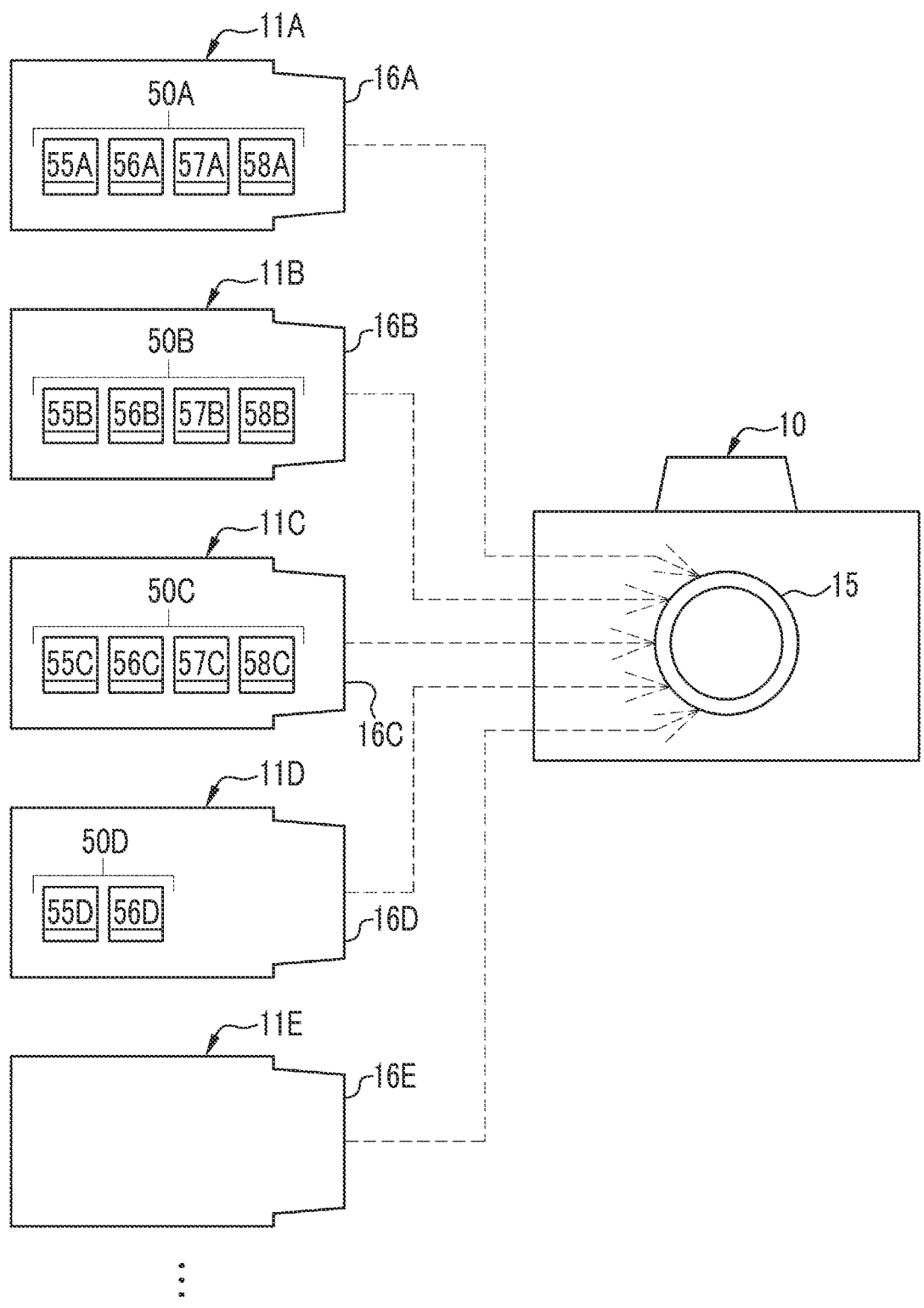
FIG. 6 is a diagram showing that a plurality of types of lens units are mounted on the lens interchangeable digital camera.

In FIG. 6, a plurality of types of lens units 11A, 11B, 11C, 11D, 11E, and the like are interchangeably mounted on the body mount 15 of the camera 10 according to imaging usage. In some cases, the lens unit 11 stores four types of optical characteristic data 50A to 50C including edge part dimming data 55A to 55C, distortion data 56A to 56C, resolution data 57A to 57C, and pupil shape data 58A to 58C as in the lens units 11A to 11C, stores only two types of optical characteristic data 50D including edge part dimming data 55D and distortion data 56D as in the lens unit 11D, or does not store the optical characteristic data 50 itself (there is no unit-side storage unit 49) as in the lens unit 11E.

Figure 7:
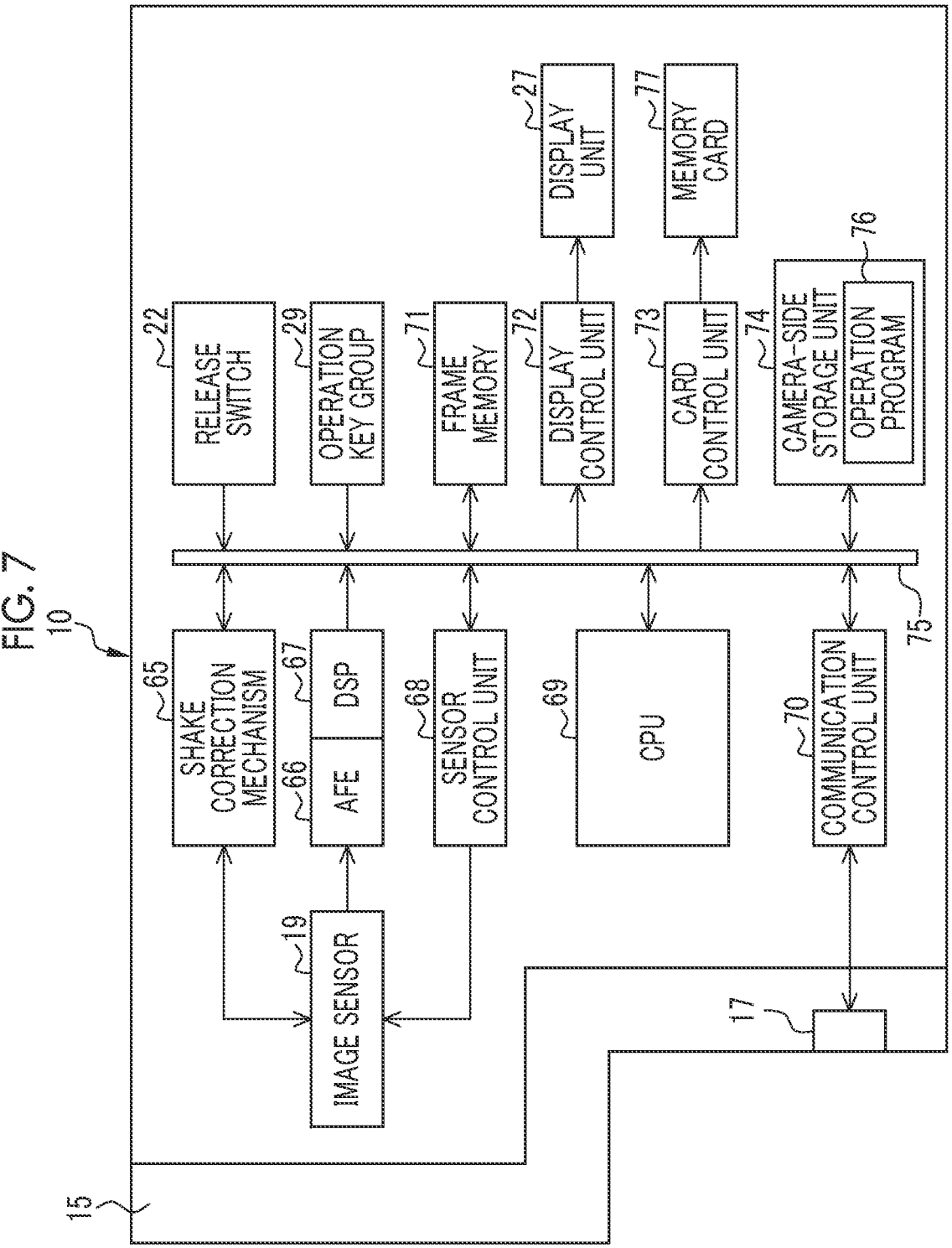
FIG. 7 is a block diagram of the lens interchangeable digital camera.

In FIG. 7, the camera 10 comprises a shake correction mechanism 65, an analog front end (AFE) 66, a digital signal processor (DSP) 67, a sensor control unit 68, and a central processing unit (CPU) 69, a communication control unit 70, a frame memory 71, a display control unit 72, a card control unit 73, and a camera-side storage unit 74. These are connected to each other through a data bus 75.

The shake correction mechanism 65 executes shake correction for canceling the influence of a shake occurring in a case where the user does not hold the camera 10 in a stable and correct manner or in a case where the camera 10 is installed on a vehicle such as a car or a ship. The shake correction mechanism 65 is a sensor movement type that performs a sensor movement operation of moving the image sensor 19 in a direction to cancel the shake.

The AFE 66 performs correlative double sampling processing, amplification processing, or analog/digital conversion processing on the analog imaging signal from the image sensor 19 to convert the signal into image data having a gradation value corresponding to a predetermined number of bits and outputs the image data to the DSP 67. The DSP 67 performs known signal processing such as gamma-correction processing, defective pixel correction processing, white balance correction processing, and demosaicing on the image data from the AFE 66.

The sensor control unit 68 controls the operation of the image sensor 19. Specifically, the sensor control unit 68 outputs a sensor control signal synchronized with a reference clock signal to be input from the CPU 69 to the image sensor 19 and causes the image sensor 19 to output an imaging signal at a predetermined frame rate.

The CPU 69 integrally controls the operation of each unit of the camera 10 based on an operation program 76 stored in the camera-side storage unit 74. For example, the CPU 69 executes the imaging preparation processing in response to the half press of the release switch 22 and executes the imaging processing in response to the release operation (full press of the release switch 22). Further, the CPU 69 executes processing according to various setting signals from the operation key group 29. FIG. 7 shows only the release switch 22 and the operation key group 29. However, the power lever 21, the exposure correction dial 23, the shutter speed/ISO sensitivity dial 24, and the like described above are also connected to the data bus 75, and the CPU 69 executes processing corresponding to these operation signals.

The communication control unit 70 controls communication with the lens unit 11 through the signal contacts 17 of the body mount 15. For example, the communication control unit 70 receives the optical characteristic data 50 to be transmitted from the communication control unit 48.

The frame memory 71 stores one-frame image data subjected to various types of signal processing by the DSP 67. The image data to be stored in the frame memory 71 is updated at any time at a predetermined frame rate.

The display control unit 72 converts the image data into a video signal such as a composite signal or a component signal and outputs the video signal to the display unit 27 as the captured image. More specifically, the display control unit 72 reads out the image data to be updated at any time at a predetermined frame rate from the frame memory 71 and causes the display unit 27 to perform the live view display based on the read image data. In addition, the display control unit 72 causes the display unit 27 to play and display the captured image recorded in the memory card 77. In addition to the above, the display control unit 72 causes the display unit 27 to display the various setting screens.

The card control unit 73 controls the recording of the captured image on the memory card 77 and the reading out of the captured image from the memory card 77. In the imaging processing accompanying the release operation, the card control unit 73 records the image data stored in the frame memory 71 at the time of the imaging processing in the memory card 77 as the captured image.

Figure 8:
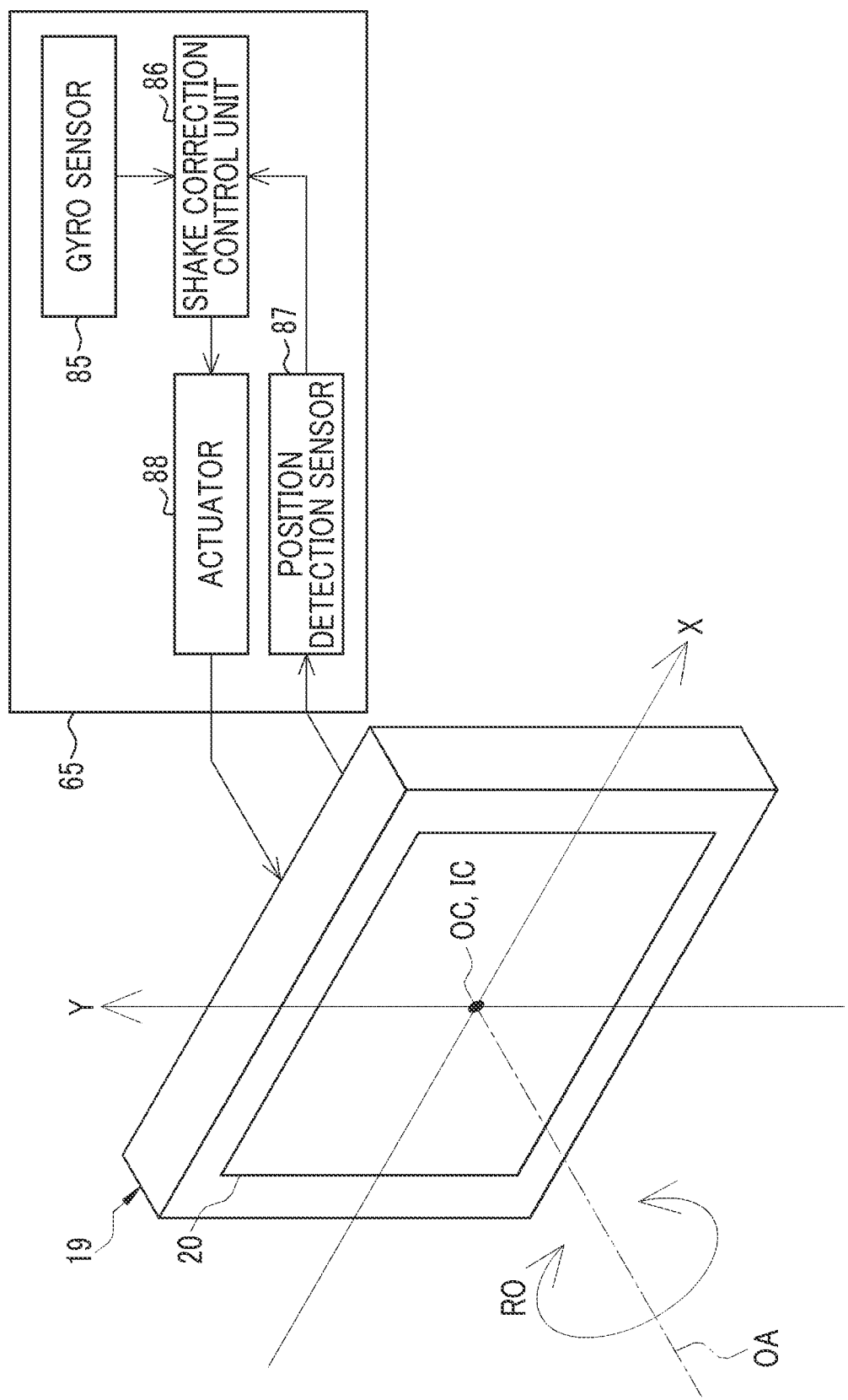
FIG. 8 is a diagram showing details of a shake correction mechanism and a sensor movement operation.

In FIG. 8, the shake correction mechanism 65 is composed of a gyro sensor 85, a shake correction control unit 86, a position detection sensor 87, and an actuator 88. The gyro sensor 85 detects a shake and outputs the detection result to the shake correction control unit 86. The shake correction control unit 86 calculates a movement amount of the image sensor 19 for canceling the shake detected by the gyro sensor 85. The shake correction control unit 86 finely adjusts the calculated movement amount based on a current position of the image sensor 19 from the position detection sensor 87 and outputs the result to the actuator 88. The actuator 88 moves the image sensor 19 by the movement amount from the shake correction control unit 86.

The sensor movement operation includes a plurality of types of sensor movement operations in which movement directions of the image sensor 19 are different. The plurality of types of sensor movement operations include a rotation operation and a shift operation. The rotation operation is to rotationally move the image sensor 19 in a state where an optical center OC which is a point through which the optical axis OA passes and an image center IC which is the center point of the imaging surface 20 are matched. For this reason, the optical center OC and the image center IC do not shift in the rotation operation. On the contrary, the shift operation is to move the image sensor 19 in parallel with a plane perpendicular to the optical axis OA (XY plane). For this reason, the optical center OC and the image center IC are shifted in the shift operation.

The rotation operation is to rotate the image sensor 19 around the optical axis OA as indicated by an arrow RO.

The shift operation includes a horizontal shift operation and a vertical shift operation. The horizontal shift operation is to move the image sensor 19 along the X-axis. The vertical shift operation is to move the image sensor 19 along the Y-axis. In this manner, the shake correction mechanism 65 performs a total of three types of sensor movement operations of the rotation operation, the horizontal shift operation, and the vertical shift operation.

Figure 9:
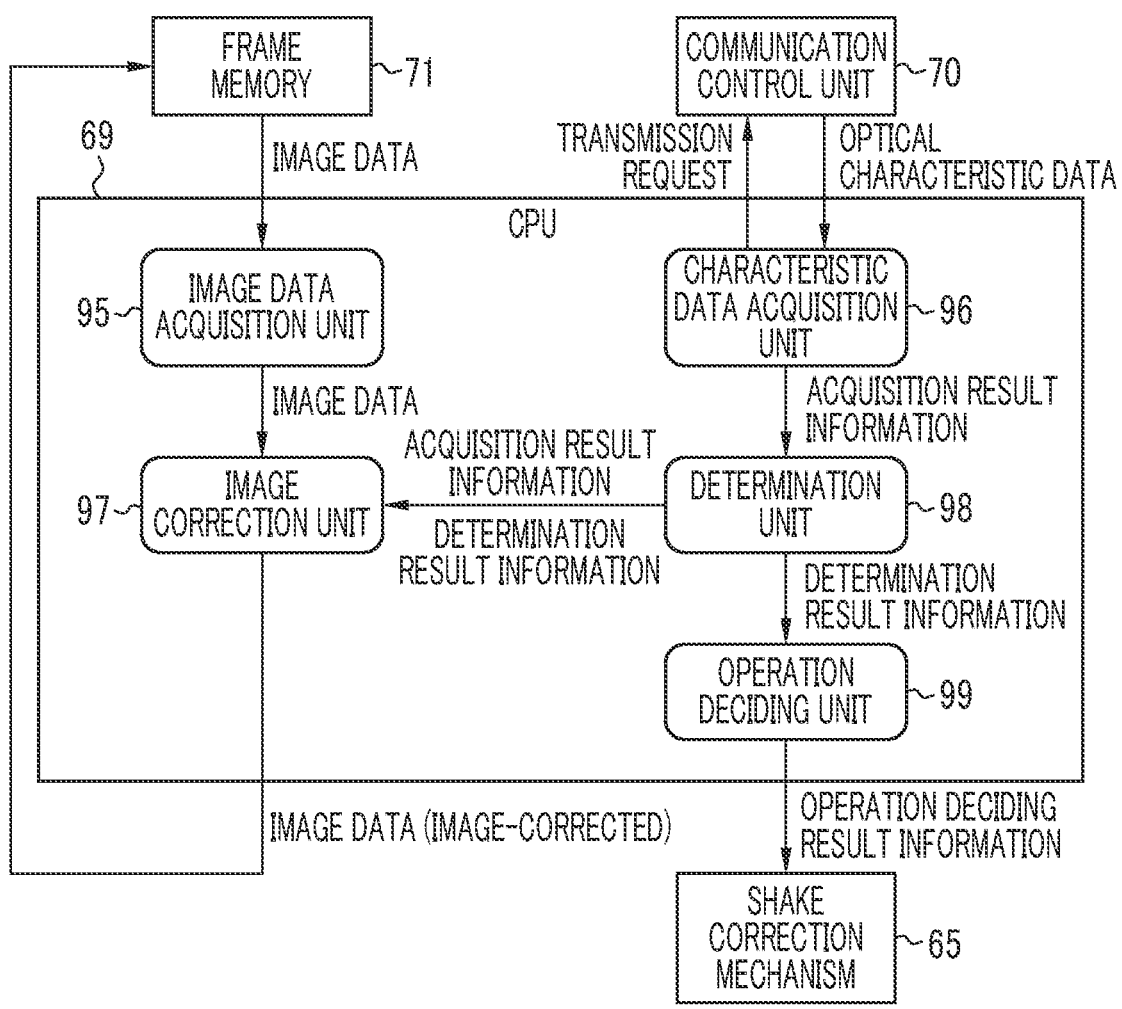
FIG. 9 is a block diagram of a CPU of the lens interchangeable digital camera.

In FIG. 9, in a case where the operation program 76 is activated, the CPU 69 functions as an image data acquisition unit 95, a characteristic data acquisition unit 96, an image correction unit 97, a determination unit 98, and an operation deciding unit 99.

The image data acquisition unit 95 reads out and acquires image data subjected to various types of signal processing by the DSP 67 from the frame memory 71. The image data acquisition unit 95 outputs the acquired image data to the image correction unit 97.

The characteristic data acquisition unit 96 corresponds to an acquisition unit and has an acquisition function of acquiring the optical characteristic data 50. The characteristic data acquisition unit 96 issues a transmission request for the optical characteristic data 50 to the communication control unit 48 through the communication control unit 70. The characteristic data acquisition unit 96 acquires the optical characteristic data 50 transmitted from the communication control unit 48 to the communication control unit 70 in response to the transmission request. That is, the characteristic data acquisition unit 96 performs a first acquisition operation of acquiring the optical characteristic data 50 stored in the unit-side storage unit 49 in the lens unit 11 mounted on the body mount 15. The characteristic data acquisition unit 96 temporarily stores the acquired optical characteristic data 50 in, for example, a work memory of the CPU 69 or the camera-side storage unit 74. The characteristic data acquisition unit 96 outputs acquisition result information (refer to FIGS. 10 to 12) indicating the acquisition result of the optical characteristic data 50 to the determination unit 98.

The image correction unit 97 has an image correction function of performing image correction on the image data from the image data acquisition unit 95 based on the optical characteristic data 50. For example, the image correction unit 97 performs correction to make the brightness of the captured image uniform as a whole with reference to the optical center OC based on the edge part dimming data 55. Alternatively, the image correction unit 97 corrects a distortion of the captured image based on the distortion data 56. The image correction unit 97 writes back the image-corrected image data to the frame memory 71. The image-corrected image data is displayed on the display unit 27 as a captured image in live view display and is recorded in the memory card 77 accompanying the release operation.

The determination unit 98 has a determination function of determining whether or not the characteristic data acquisition unit 96 can acquire the adaptive optical characteristic data which is the optical characteristic data 50 that can be handled by the image correction unit 97. The determination unit 98 outputs determination result information indicating the determination result to the image correction unit 97 and the operation deciding unit 99. In a case where the determination unit 98 determines that the characteristic data acquisition unit 96 can acquire the adaptive optical characteristic data, the determination unit 98 outputs the acquisition result information to the image correction unit 97.

Figure 11:
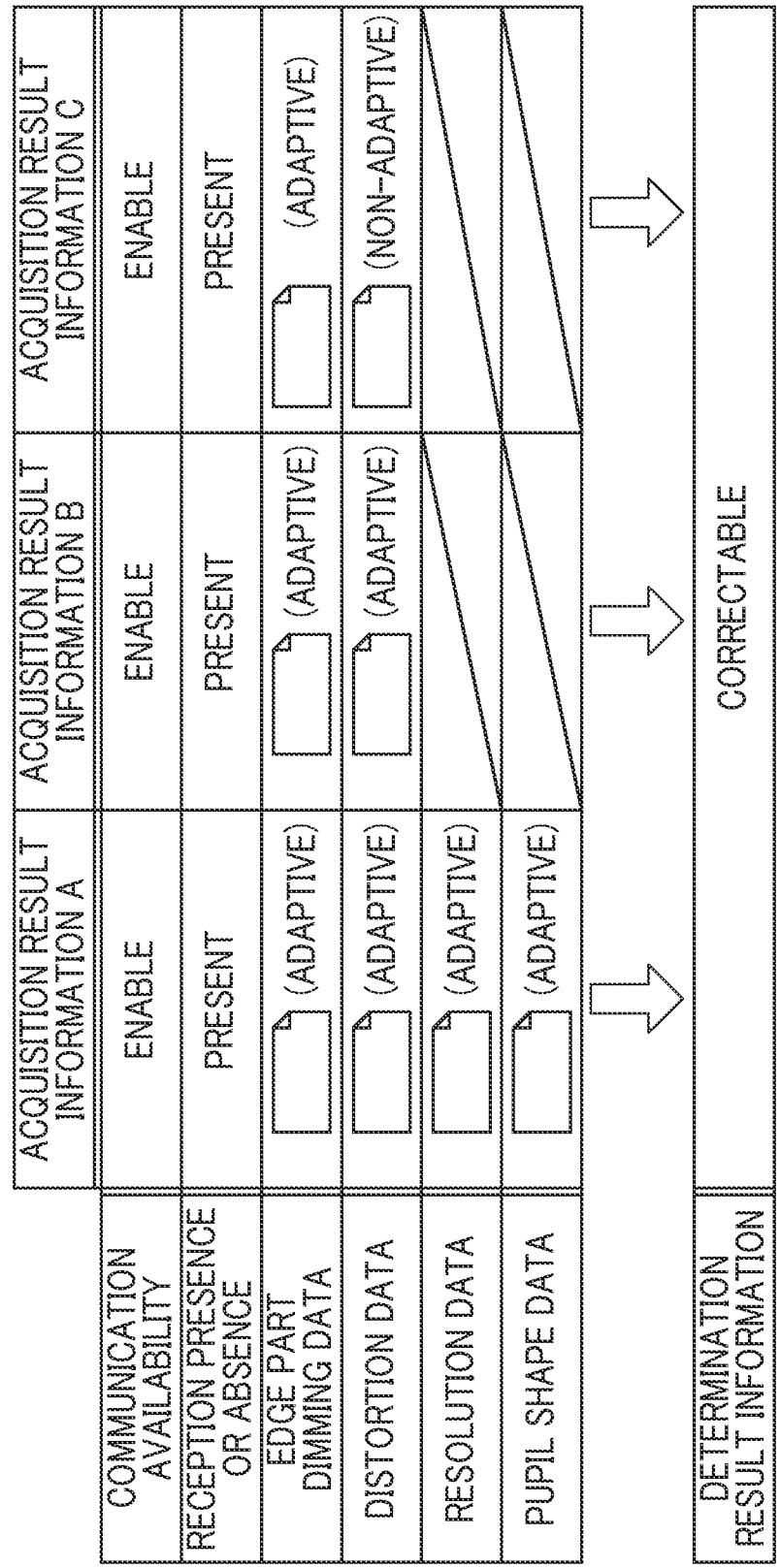
FIG. 11 is a table showing determination result information with respect to acquisition result information.
Figure 12:
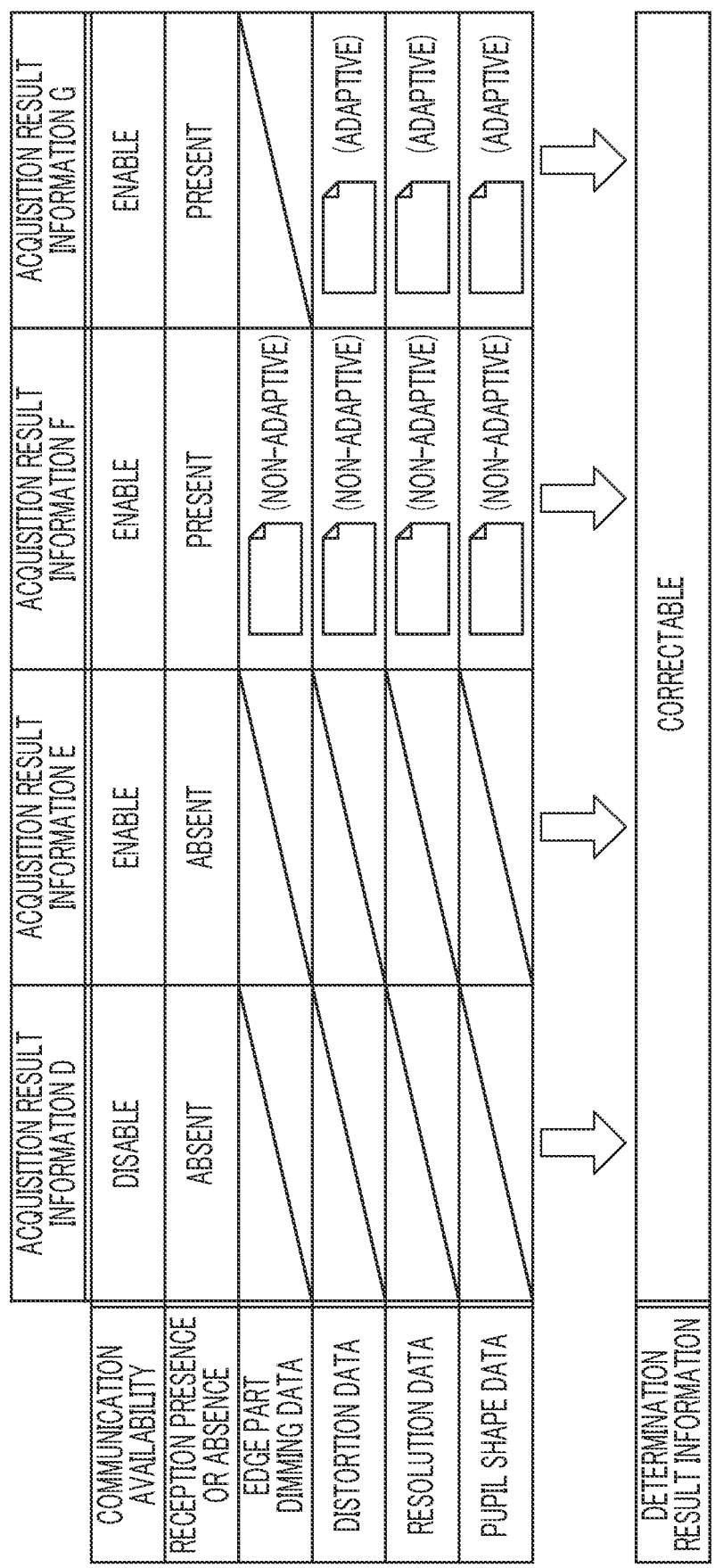
FIG. 12 is a table showing determination result information with respect to acquisition result information.
Figure 13:
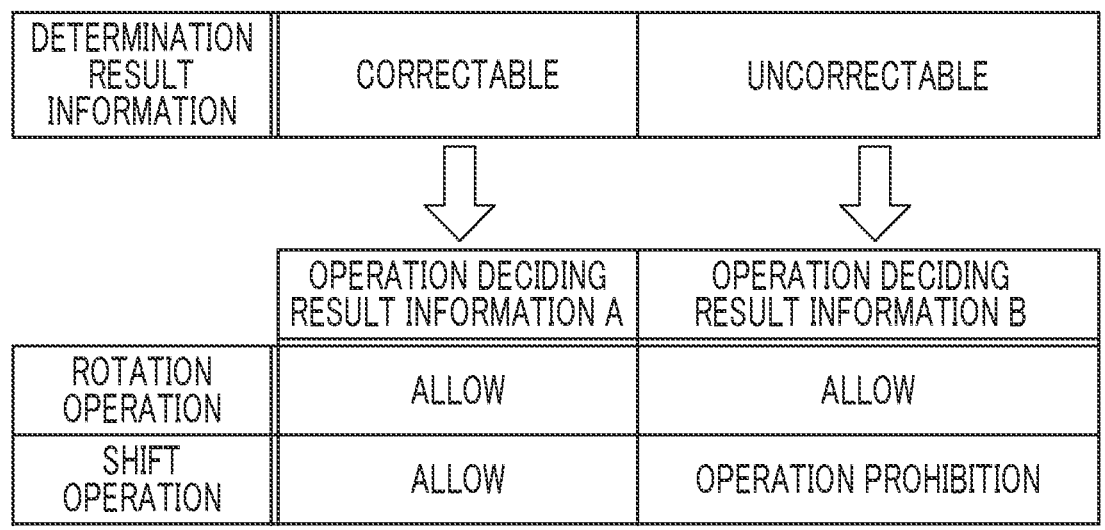
FIG. 13 is a table showing operation deciding result information with respect to determination result information.

The determination result information indicates whether there is a correctable state where the image correction based on the adaptive optical characteristic data is possible by the image correction unit 97 since the characteristic data acquisition unit 96 can acquire the adaptive optical characteristic data or, on the contrary, there is an uncorrectable state where the image correction is not possible since the characteristic data acquisition unit 96 cannot acquire the adaptive optical characteristic data (refer to FIGS. 11 to 13).

The operation deciding unit 99 has an operation deciding function of deciding the operation of the shake correction mechanism 65 according to the determination result information from the determination unit 98. The operation deciding unit 99 restricts at least a part of the sensor movement operation of the shake correction mechanism 65 allowed in the correctable state, in the uncorrectable state. The operation deciding unit 99 outputs operation deciding result information indicating the decided operation to the shake correction mechanism 65. The operation deciding result information is information in which allowance or restriction on the operation is set for the rotation operation and the shift operation, respectively (refer to FIG. 13).

Although not shown, the CPU 69 is also provided with an image processing unit that performs various types of image processing such as color enhancement processing and outline enhancement processing.

As shown in FIG. 10, the acquisition result information is provided with each item of communication availability and reception presence or absence, and the acquired optical characteristic data 50 is attached. The characteristic data acquisition unit 96 registers whether or not the communication control unit 48 and the communication control unit 70 of the lens unit 11 mounted on the body mount 15 can communicate with each other in the communication availability item. The characteristic data acquisition unit 96 registers whether or not the communication control unit 70 receives the optical characteristic data 50 in the reception presence or absence item.

FIGS. 11 and 12 show determination result information for each pattern of the acquisition result information. First, in FIG. 11, all of acquisition result information A, B, and C are cases where the communication control unit 70 can communicate with the lens unit 11 and can receive the optical characteristic data 50. The acquisition result information A is obtained in a case where the edge part dimming data 55, the distortion data 56, the resolution data 57, and the pupil shape data 58 can be received, and all of them are the adaptive optical characteristic data. The acquisition result information B is obtained in a case where the edge part dimming data 55 and the distortion data 56 can be received, and all of them are the adaptive optical characteristic data. The acquisition result information C is obtained in a case where the edge part dimming data 55 and the distortion data 56 can be received, the edge part dimming data 55 is the adaptive optical characteristic data, and the distortion data 56 is not the adaptive optical characteristic data (non-adaptive optical characteristic data). In any of these cases, the determination unit 98 determines that the adaptive optical characteristic data can be acquired and outputs determination result information indicating the correctable state.

The edge part dimming data 55 corresponds to a specific type of optical characteristic data. For this reason, in a case where the adaptive optical characteristic data of the edge part dimming data 55 can be acquired, the determination unit 98 determines that the adaptive optical characteristic data can be acquired regardless of whether or not the adaptive optical characteristic data of other data can be acquired, as shown by the acquisition result information B and C.

On the other hand, FIG. 12 shows a pattern of the acquisition result information in which the determination unit 98 determines that the adaptive optical characteristic data cannot be acquired and outputs determination result information indicating the uncorrectable state. First, the acquisition result information D is obtained in a case where the communication control unit 70 cannot communicate with the lens unit 11. In the case of the acquisition result information D, for example, contact failure of the signal contacts 17 and 18, and failure of the communication control units 48 and 70 are considered.

The acquisition result information E is obtained in a case where the communication control unit 70 can communicate with the lens unit 11, but cannot receive the optical characteristic data 50. In the case of the acquisition result information E, for example, a case where a lens unit 11E in which the optical characteristic data 50 itself is not stored is mounted as shown in FIG. 6 can be considered. In the case of the acquisition result information E and the acquisition result information D described above, the optical characteristic data 50 is naturally not attached.

The acquisition result information F and G are obtained in a case where the communication control unit 70 can communicate with the lens unit 11 and can receive the optical characteristic data 50 similar to the acquisition result information A to C in FIG. 11. However, the acquisition result information F is obtained in a case where the acquired optical characteristic data 50 is all non-adaptive optical characteristic data including the edge part dimming data 55. The acquisition result information G is obtained in a case where the distortion data 56, the resolution data 57, and the pupil shape data 58 acquire the adaptive optical characteristic data, but the edge part dimming data 55 does not acquire the adaptive optical characteristic data.

FIG. 13 shows a pattern of the operation deciding result information with respect to the determination result information. First, in a case where the determination result information indicating the correctable state is output from the determination unit 98, the operation deciding unit 99 outputs operation deciding result information A indicating that both the rotation operation and the shift operation are allowed. On the other hand, in a case where the determination result information indicating the uncorrectable state is output from the determination unit 98, the operation deciding unit 99 outputs operation deciding result information B indicating that the rotation operation is allowed but the shift operation is prohibited and restricted.

That is, the operation deciding unit 99 restricts at least the shift operation and allows the rotation operation regardless of the correctable state or the uncorrectable state. Further, the restriction decided by the operation deciding unit 99 in the uncorrectable state includes operation prohibition.

In a case where the determination result information indicating the correctable state is output from the determination unit 98, the image correction unit 97 performs the image correction on the image data based on the optical characteristic data 50 (adaptive optical characteristic data) attached to the acquisition result information. On the other hand, in a case where the determination result information indicating the uncorrectable state is output from the determination unit 98, the image correction unit 97 naturally does not perform the image correction. In the case, the image correction unit 97 writes back the image data from the image data acquisition unit 95 to the frame memory 71 as it is.

Next, actions of the above configuration will be described with reference to a flowchart in FIG. 14. First, the lens unit 11 is mounted on the body mount 15 (step ST100). Then, a first acquisition operation is performed by the characteristic data acquisition unit 96 (step ST110). More specifically, processing (issue of transmission request for the optical characteristic data 50 or the like) for establishing communication with the communication control unit 48 of the lens unit 11 through the communication control unit 70 and receiving the optical characteristic data 50 from the unit-side storage unit 49 is performed.

After the first acquisition operation, the acquisition result information as shown in FIGS. 10 to 12 is output from the characteristic data acquisition unit 96 to the determination unit 98. Based on the acquisition result information, the determination unit 98 determines whether or not the characteristic data acquisition unit 96 acquires the adaptive optical characteristic data (step ST120 to step ST140, determination step). First, the communication control unit 70 determines whether or not the communication with the mounted lens unit 11 can be performed (step ST120). It is determined whether or not the communication control unit 70 can receive the optical characteristic data 50 (step ST130). Further, it is determined whether or not the optical characteristic data 50 received by the communication control unit 70 is the adaptive optical characteristic data (step ST140).

In the communication control unit 70, in a case where the communication control unit 70 can communicate with the lens unit 11 and receive the optical characteristic data 50, and the received optical characteristic data 50 is the adaptive optical characteristic data (YES in steps ST120 to ST140), the determination result information indicating the correctable state is output from the determination unit 98 to the operation deciding unit 99 as shown in FIG. 11. As indicated by the operation deciding result information A in FIG. 13, the operation deciding unit 99 decides that both the rotation operation and the shift operation are allowed (step ST150, operation deciding step). In response to the deciding (operation deciding result information A), the rotation operation and the shift operation are allowed in the shake correction mechanism 65. In the case, the image correction unit 97 performs the image correction on the image data based on the optical characteristic data 50 (step ST160, image correction step).

On the other hand, in the case where the communication control unit 70 cannot communicate with the lens unit 11 (NO in step ST120), in the case where the communication control unit 70 cannot receive the optical characteristic data 50 (NO in step ST130), and in the case where the received optical characteristic data 50 is not the adaptive optical characteristic data (NO in step ST140), the determination result information indicating the uncorrectable state is output from the determination unit 98 to the operation deciding unit 99 as shown in FIG. 12. In the case, as indicated by the operation deciding result information B in FIG. 13, the operation deciding unit 99 decides that the rotation operation is allowed but the shift operation is prohibited and restricted (step ST170, operation deciding step). In response to the deciding (operation deciding result information B), the rotation operation is allowed and the shift operation is prohibited in the shake correction mechanism 65. In the case, the image correction unit 97 naturally does not perform the image correction (step ST180).

In a case where the lens unit 11 is interchanged (YES in step ST190), the processing returns to step ST100. Further, until the power lever 21 is operated and the power of the camera 10 is turned off (YES in step ST200), processing of steps ST150 and ST160 are continued in a case of the correctable state (YES in step ST210) and processing of steps ST170 and ST180 are continued in a case of the uncorrectable state (NO in step ST210).

The sensor movement operation by the shake correction mechanism 65 is restricted in the uncorrectable state where the adaptive optical characteristic data cannot be acquired and the image correction cannot be performed. Therefore, the shift between the optical center OC and the image center IC is not noticeable due to the optical characteristics, for example, in the captured image of the live view display of the display unit 27, and thus there is no possibility of causing the user a sense of discomfort. In particular, since the shift operation in which the optical center OC and the image center IC are shifted is prohibited, it is possible to surely eliminate the possibility of causing the user a sense of discomfort.

On the other hand, since the optical center OC and the image center IC are not shifted in the rotation operation, the rotation operation is allowed regardless of the correctable state or the uncorrectable state. Even in the above case, there is no possibility of causing the user a sense of discomfort. In addition, since the shake correction by the rotation operation is always performed, it is possible to maintain the image quality of the captured image at a certain level.

In the case of the uncorrectable state, not only the shift operation but also the rotation operation may be prohibited and restricted as in the operation deciding result information C shown in FIG. 15. In other words, at least one of the plurality of types of sensor movement operations may be restricted. The image sensor 19 is moved to the origin position of a rotation angle and the operation prohibition is executed also for the rotation operation.

Further, a movable range of the shift operation in the case of the uncorrectable state may be restricted (range restriction) compared with a movable range in the case of the correctable state as in operation deciding result information D shown in FIG. 16. A range where the shift between the optical center OC and the image center IC is not noticeable due to the edge part dimming, for example, in a case where a lens unit 11 having the imaging optical system 35 with the largest edge part dimming is mounted is set for the movable range of the shift operation in the case of the uncorrectable state. For this reason, the movable range of the shift operation in the case of the uncorrectable state is a very narrow range compared with the movable range in the correctable state.

In this manner, in a case where the shift operation is not completely prohibited in the case of the uncorrectable state and the shift operation is allowed even though the range is narrow, it is possible to contribute to improving the image quality of the captured image.

More specifically, the shift operation of the shake correction mechanism 65 is effective for shift shake correction in an XY direction or rotation shake correction around an XY axis. However, in a case where the shift operation of the shake correction mechanism 65 is completely prohibited, the effective shake correction is not performed. Therefore, the image quality of the captured image may be significantly deteriorated. However, it is possible to eliminate such an adverse effect by allowing the shift operation as shown in FIG. 16.

Note that the specific type of optical characteristic data used for determining whether there is the correctable state or the uncorrectable state is not limited to the edge part dimming data 55. The distortion data 56 may be the specific type of optical characteristic data, and the edge part dimming data 55 and the distortion data 56 may be the specific type of optical characteristic data. However, the edge part dimming is optical characteristics in which the shift between the optical center OC and the image center IC is more noticeable. Therefore, it is preferable that the edge part dimming data 55 is the specific type of optical characteristic data.

In a case where the characteristic data acquisition unit 96 can acquire the adaptive optical characteristic data of all of the optical characteristic data 50, not in a case where the characteristic data acquisition unit 96 can acquire the adaptive optical characteristic data of the specific type of optical characteristic data, the determination unit 98 may determine that the adaptive optical characteristic data can be acquired. Specifically, the determination unit 98 determines that the adaptive optical characteristic data can be acquired only in the case of the acquisition result information A shown in FIG. 11. By doing this, the sensor movement operation is restricted in a case where the adaptive optical characteristic data cannot be acquired even in one of the plurality of types of optical characteristic data 50. Therefore, it is possible to more surely eliminate the possibility of causing the user a sense of discomfort.

Second Embodiment

Figure 17:
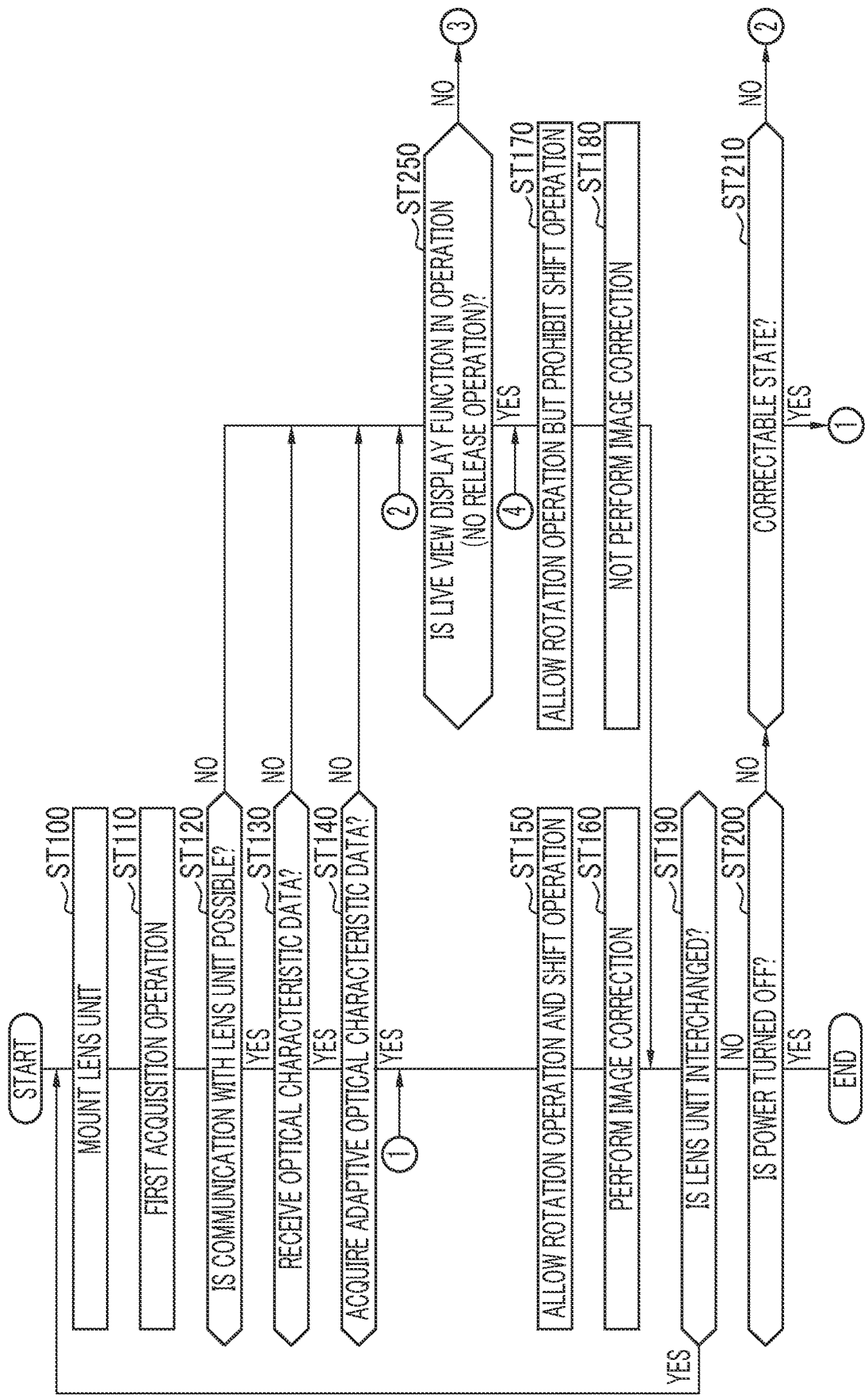
FIG. 17 is a flowchart showing a processing procedure of a lens interchangeable digital camera according to a second embodiment.
Figure 18:
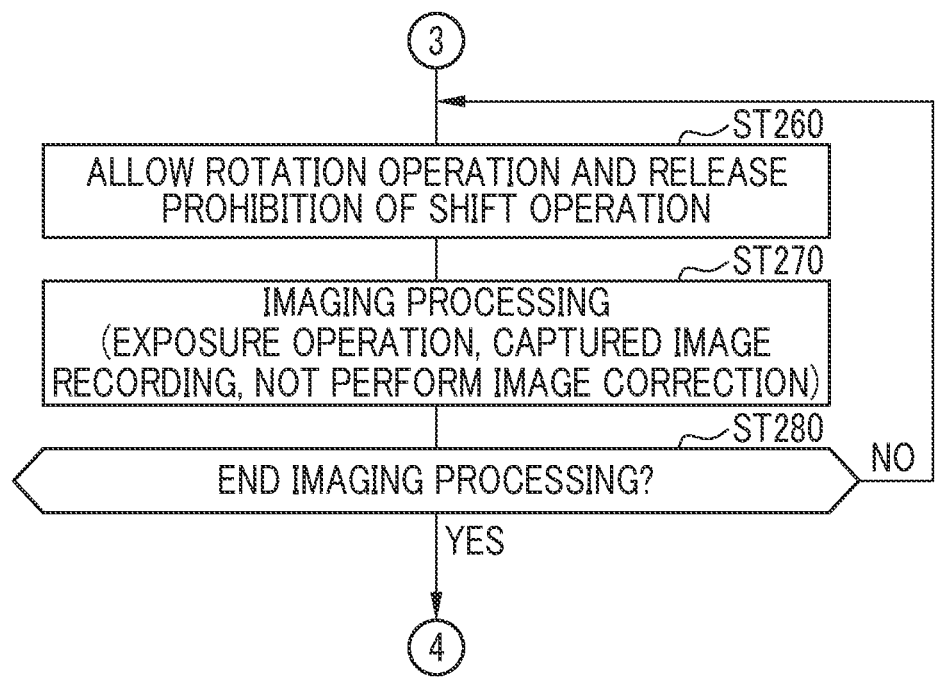
FIG. 18 is a flowchart showing the processing procedure of the lens interchangeable digital camera according to the second embodiment.

FIGS. 17 and 18 are flowcharts showing a processing procedure according to a second embodiment. In the second embodiment, the operation deciding unit 99 restricts the sensor movement operation during the operation of the live view display function in the uncorrectable state and releases the restriction on the sensor movement operation while the image sensor 19 executes the main imaging operation of the captured image in response to the release operation. In the following, a description of points that are common to the first embodiment will be omitted as appropriate, and differences from the first embodiment will be mainly described. The same applies to the following embodiments.

As shown in FIG. 17, in the case where the communication control unit 70 cannot communicate with the lens unit 11 (NO in step ST120), in the case where the communication control unit 70 cannot receive the optical characteristic data 50 (NO in step ST130), and in the case where the determination unit 98 determines that the optical characteristic data 50 from the characteristic data acquisition unit 96 is not the adaptive optical characteristic data (NO in step ST140), and in a case where the live view display function is in operation (no release operation) (YES in step ST250), the operation deciding unit 99 decides that the rotation operation is allowed but the shift operation is prohibited and restricted (step ST170, operation deciding step) as in the first embodiment.

On the other hand, in a case where the release operation is performed and the operation of the live view display function is stopped (NO in step ST250), the operation deciding unit 99 releases the prohibition of the shift operation while the rotation operation is allowed (step ST260) as shown in FIG. 18. Then, the imaging processing such as the main imaging operation of the image sensor 19 and recording of the captured image on the memory card 77 is executed in the state where the prohibition of the shift operation is released. However, since the uncorrectable state is not changed, the image correction unit 97 does not perform the image correction (step ST270). The pieces of processing in steps ST260 and ST270 are continued until the imaging processing ends (YES in step ST280). Since the operation of the live view display function is resumed after the end of the imaging processing, the processing returns to step ST170 and the shift operation is prohibited again. In the case, the image sensor 19 is moved to the origin position where the optical center OC matches the image center IC and the shift operation is prohibited in a case where the optical center OC and the image center IC are shifted due to the shift operation.

A time required for the main imaging operation of the captured image in response to the release operation is very shorter than a time for which composition of the captured image is decided using the live view display function. For this reason, it is considered that the shift between the optical center OC and the image center IC due to the sensor movement operation (shift operation) is relatively small during the main imaging operation. That is, even in a case where the restriction on the sensor movement operation is released during the main imaging operation, it is considered that there is a relatively low possibility of causing the user a sense of discomfort. For this reason, the restriction on the sensor movement operation is released during the main imaging operation in the second embodiment. By doing this, it is possible to contribute to improving the image quality of the captured image.

There may be a configuration in which a constant shake correction mode that allows all sensor movement operations and an imaging shake correction mode that releases the restriction on the sensor movement operation only during the main imaging operation in the second embodiment are switchable regardless of the correctable state or the uncorrectable state. In a case where the constant shake correction mode is selected and the determination unit 98 determines that there is the uncorrectable state, the imaging shake correction mode is forcibly set. Alternatively, a message that recommends the user to switch from the constant shake correction mode to the imaging shake correction mode may be displayed on the display unit 27 to prompt the user to switch the mode to the imaging shake correction mode.

Third Embodiment

Figure 19:
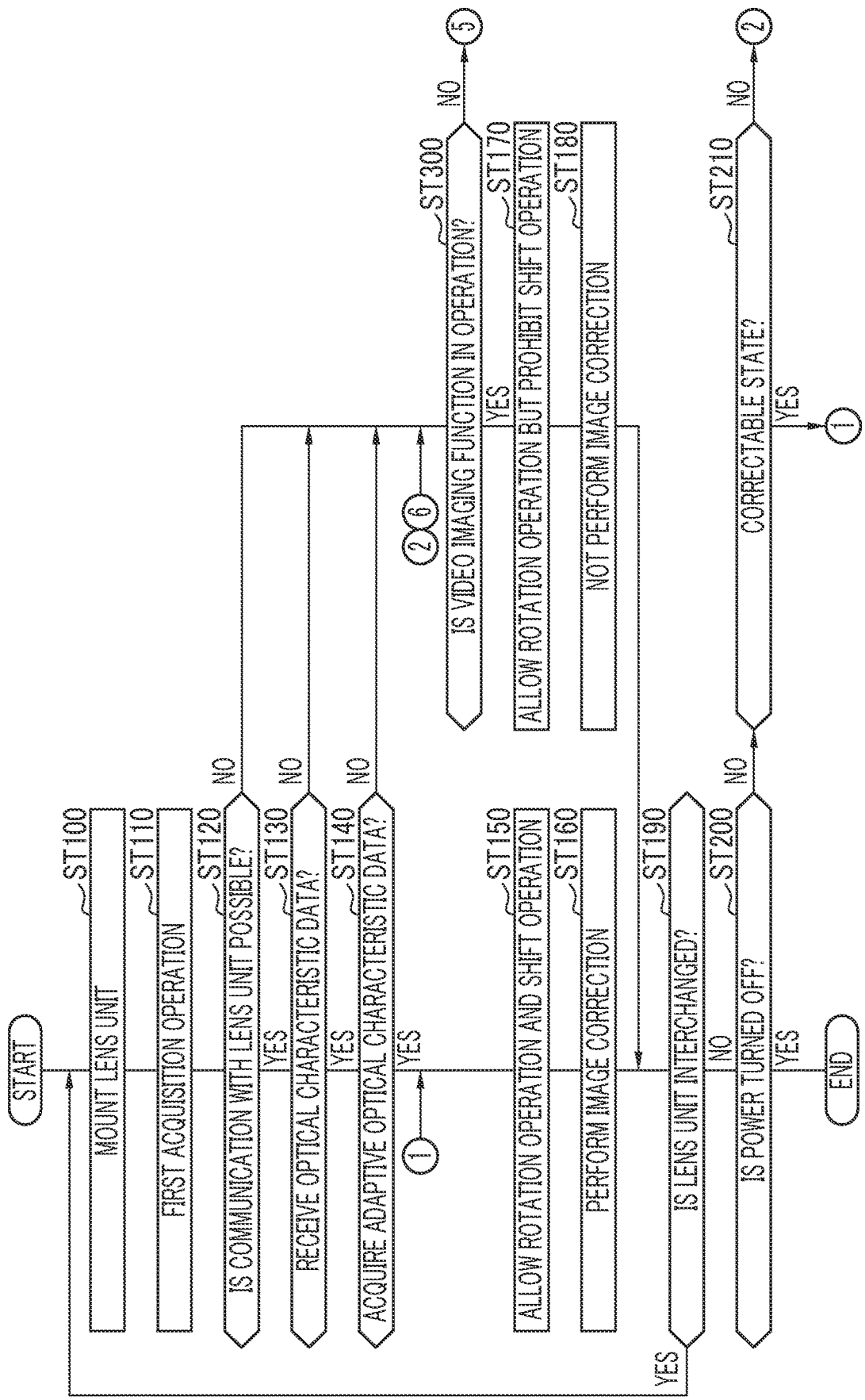
FIG. 19 is a flowchart showing a processing procedure of a lens interchangeable digital camera according to a third embodiment.
Figure 20:
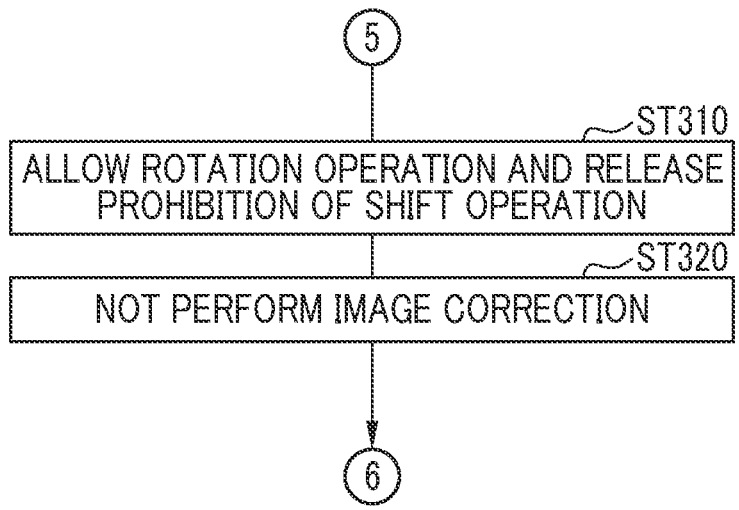
FIG. 20 is a flowchart showing the processing procedure of the lens interchangeable digital camera according to the third embodiment.

FIGS. 19 and 20 are flowcharts showing a processing procedure according to the third embodiment. In the third embodiment, the operation deciding unit 99 restricts the sensor movement operation while a video imaging function is in operation and releases the restriction on the sensor movement operation while the video imaging function is not in operation, in the uncorrectable state.

As shown in FIG. 19, in the case where the communication control unit 70 cannot communicate with the lens unit 11 (NO in step ST120), in the case where the communication control unit 70 cannot receive the optical characteristic data 50 (NO in step ST130), and in the case where the determination unit 98 determines that the optical characteristic data 50 from the characteristic data acquisition unit 96 is not the adaptive optical characteristic data (NO in step ST140), and in a case where the video imaging function is in operation (YES in step ST300), the operation deciding unit 99 decides that the rotation operation is allowed but the shift operation is prohibited and restricted (step ST170, operation deciding step) as in the first embodiment.

On the other hand, in a case where the video imaging function is not in operation (NO in step ST300), the operation deciding unit 99 releases the prohibition of the shift operation while the rotation operation is allowed as shown in FIG. 20 (step ST310). However, since the uncorrectable state is not changed, the image correction unit 97 does not perform the image correction (step ST320). The pieces of processing in steps ST310 and ST320 are continued until the video imaging function is operated (YES in step ST300). In a case where the optical center OC and the image center IC are shifted due to the shift operation at the time of the operation of the video imaging function, the image sensor 19 is moved to the origin position where the optical center OC matches the image center IC and the shift operation is prohibited.

During the operation of the video imaging function, the captured image in live view display is continuously recorded in the memory card 77. Therefore, in a case where the sensor movement operation (shift operation) is allowed during the operation of the video imaging function, the shift between the optical center OC and the image center IC is noticeable due to the optical characteristics as in the operation of the live view display function and thus the user feels a sense of discomfort. In particular, the shift between the optical center OC and the image center IC varies with time in the case of a video. Therefore, the user may feel further a sense of discomfort. For this reason, the sensor movement operation is restricted during the operation of the video imaging function in the third embodiment. By doing this, it is not necessary to cause the user who views the video a sense of discomfort. Further, in the case where the video imaging function is not in operation, the restriction on the sensor movement operation is released. Therefore, it is possible to contribute to improving the image quality of the captured image.

Fourth Embodiment

In a fourth embodiment shown in FIGS. 21 to 25, the characteristic data acquisition unit 96 performs a second acquisition operation of storing the optical characteristic data 50 in the camera-side storage unit 74 and acquiring the optical characteristic data 50 from the camera-side storage unit 74.

Figure 21:
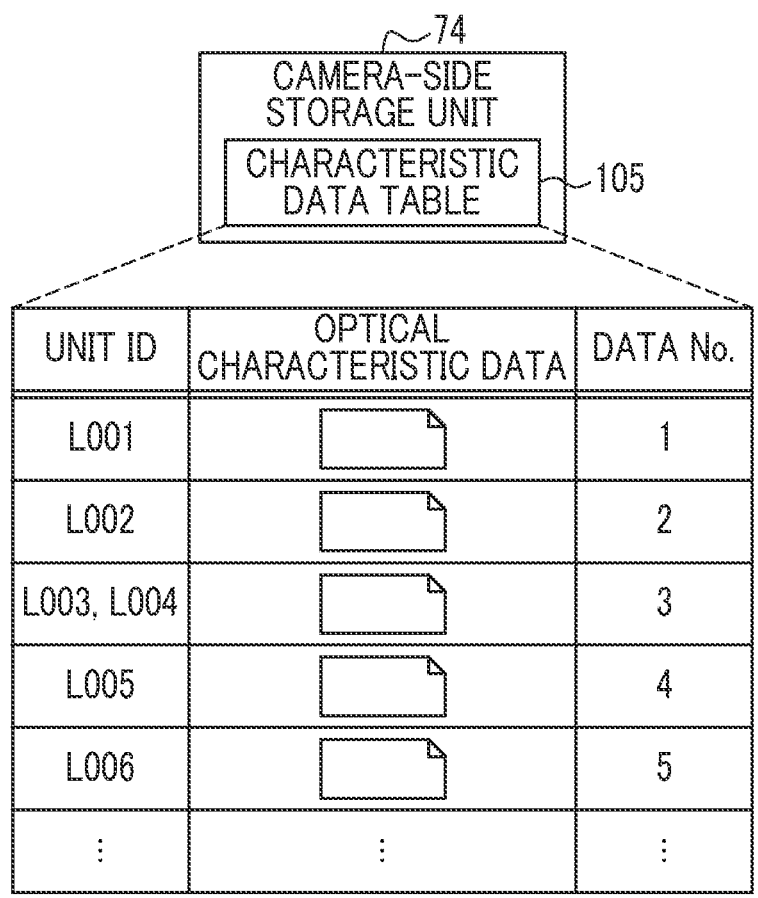
FIG. 21 is a diagram showing a characteristic data table stored in a camera-side storage unit.

As shown in FIG. 21, a characteristic data table 105 is stored in the camera-side storage unit 74 in the fourth embodiment. The characteristic data table 105 stores the optical characteristic data 50 in association with unit identification data (ID). The unit ID is identification information for identifying each of the plurality of types of lens units 11. A data No. which is a serial number is assigned to each of optical characteristic data 50. In some cases, one piece of optical characteristic data 50 common to two or more lens units 11 is stored, such as unit IDs "L003" and "L004".

All of the optical characteristic data 50 stored in the characteristic data table 105 is the adaptive optical characteristic data that can be handled by the image correction unit 97. In addition, the optical characteristic data 50 stored in the characteristic data table 105 includes data registered at the time of manufacturing the camera 10 and data that is acquired by the characteristic data acquisition unit 96 from the unit-side storage unit 49 of the lens unit 11 and newly registered. The user may acquire the optical characteristic data 50 through a network and register the data in the characteristic data table 105.

Figure 22:
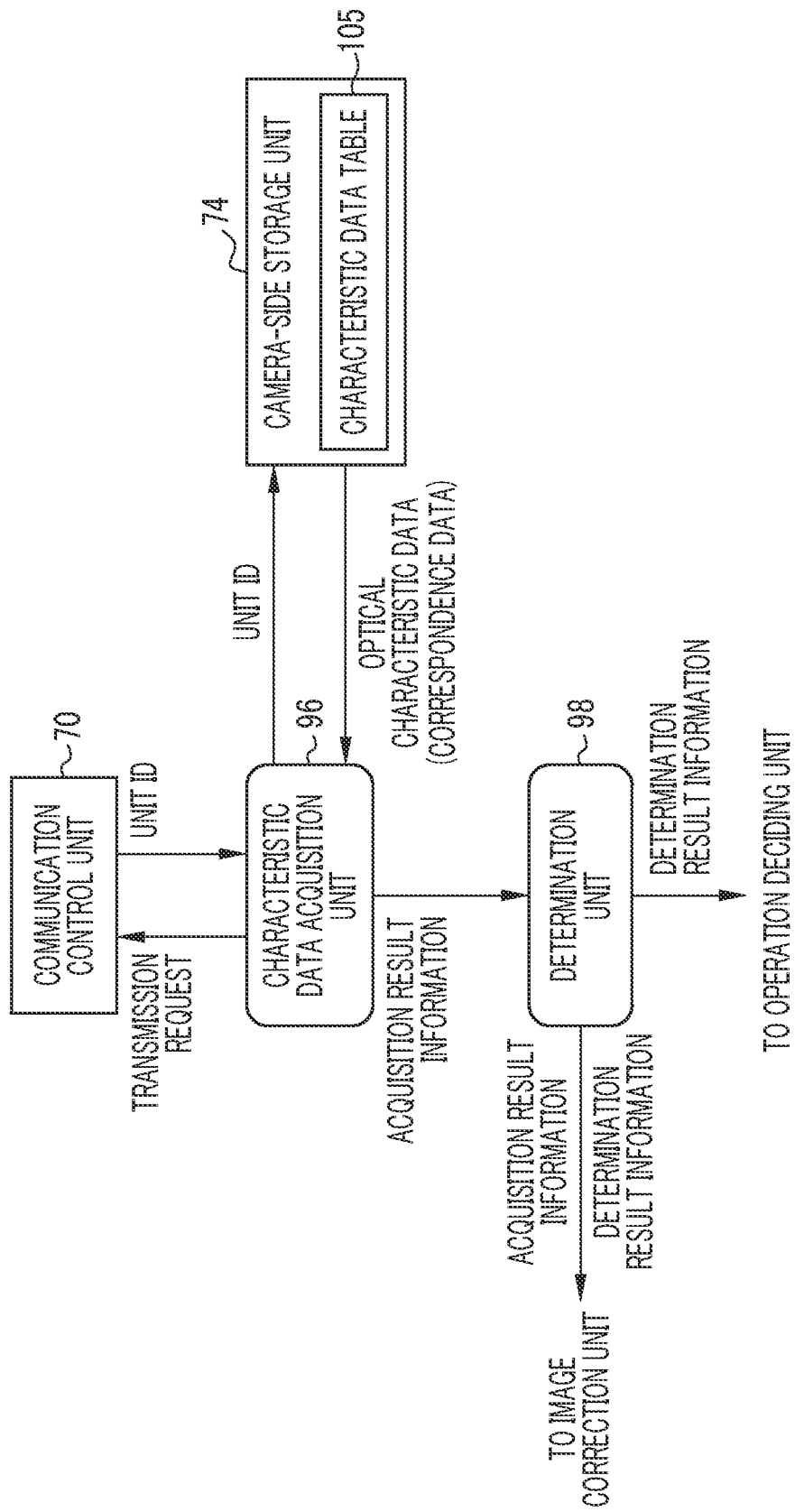
FIG. 22 is a diagram showing functions of a CPU of a lens interchangeable digital camera according to a fourth embodiment.

In FIG. 22, the characteristic data acquisition unit 96 issues a transmission request for the unit ID to the communication control unit 48 through the communication control unit 70. The characteristic data acquisition unit 96 acquires the unit ID transmitted from the communication control unit 48 to the communication control unit 70 in response to the transmission request as the second acquisition operation. Then, correspondence data which is the optical characteristic data 50 corresponding to the acquired unit ID is read out and acquired from the characteristic data table 105.

The acquisition result information is provided with an item for registering whether or not the correspondence data can be acquired, in addition to the items in the first embodiment. A case where the correspondence data cannot be acquired is, that is, a case where the correspondence data is not stored in the characteristic data table 105. In FIG. 22, only units related to the description among the units constructed in the CPU 69 are shown, and other units are omitted. The same applies to the following embodiments.

Figure 23:
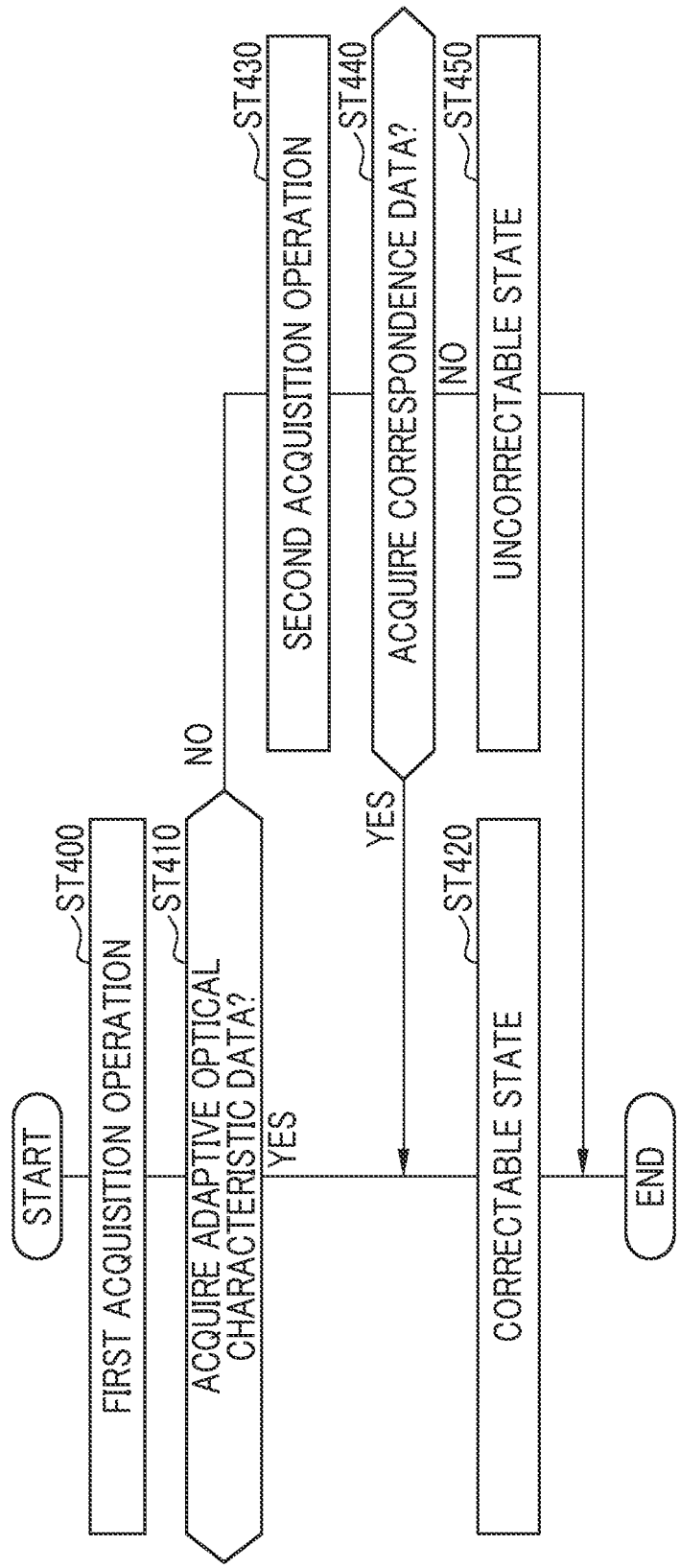
FIG. 23 is a flowchart showing an outline of a processing procedure of the lens interchangeable digital camera according to the fourth embodiment.

FIG. 23 is a flowchart showing an outline of a processing procedure of the camera 10 according to the fourth embodiment. In the fourth embodiment, the characteristic data acquisition unit 96 first performs the first acquisition operation (step ST400). As described above, the first acquisition operation is an operation of acquiring the optical characteristic data 50 stored in the unit-side storage unit 49 in the lens unit 11 mounted on the body mount 15.

In a case where the adaptive optical characteristic data can be acquired by the first acquisition operation (YES in step ST410), the determination result information indicating the correctable state is output from the determination unit 98 to the operation deciding unit 99 (step ST420).

On the contrary, in a case where the adaptive optical characteristic data cannot be acquired by the first acquisition operation (NO in step ST410), the characteristic data acquisition unit 96 performs the second acquisition operation (step ST430). In a case where the correspondence data can be acquired by the second acquisition operation (YES in step ST440), the determination result information indicating the correctable state is output from the determination unit 98 to the operation deciding unit 99 (step ST420) as in the case where the adaptive optical characteristic data can be acquired by the first acquisition operation. On the other hand, in a case where the correspondence data cannot be acquired by the second acquisition operation, that is, in a case where the correspondence data is not stored in the characteristic data table 105 (NO in step ST440), the determination result information indicating the uncorrectable state is output from the determination unit 98 to the operation deciding unit 99 (step ST450).

As described above, the correctable state is a case where the adaptive optical characteristic data can be acquired by any one of the first acquisition operation or the second acquisition operation, and the uncorrectable state is a case where the adaptive optical characteristic data cannot be acquired by any one of the first acquisition operation or the second acquisition operation. The characteristic data acquisition unit 96 first performs the first acquisition operation and performs the second acquisition operation in a case where the adaptive optical characteristic data cannot be acquired by the first acquisition operation. Further, a case where the adaptive optical characteristic data cannot be acquired by the second acquisition operation includes a case where the correspondence data is not stored in the camera-side storage unit 74.

Figure 24:
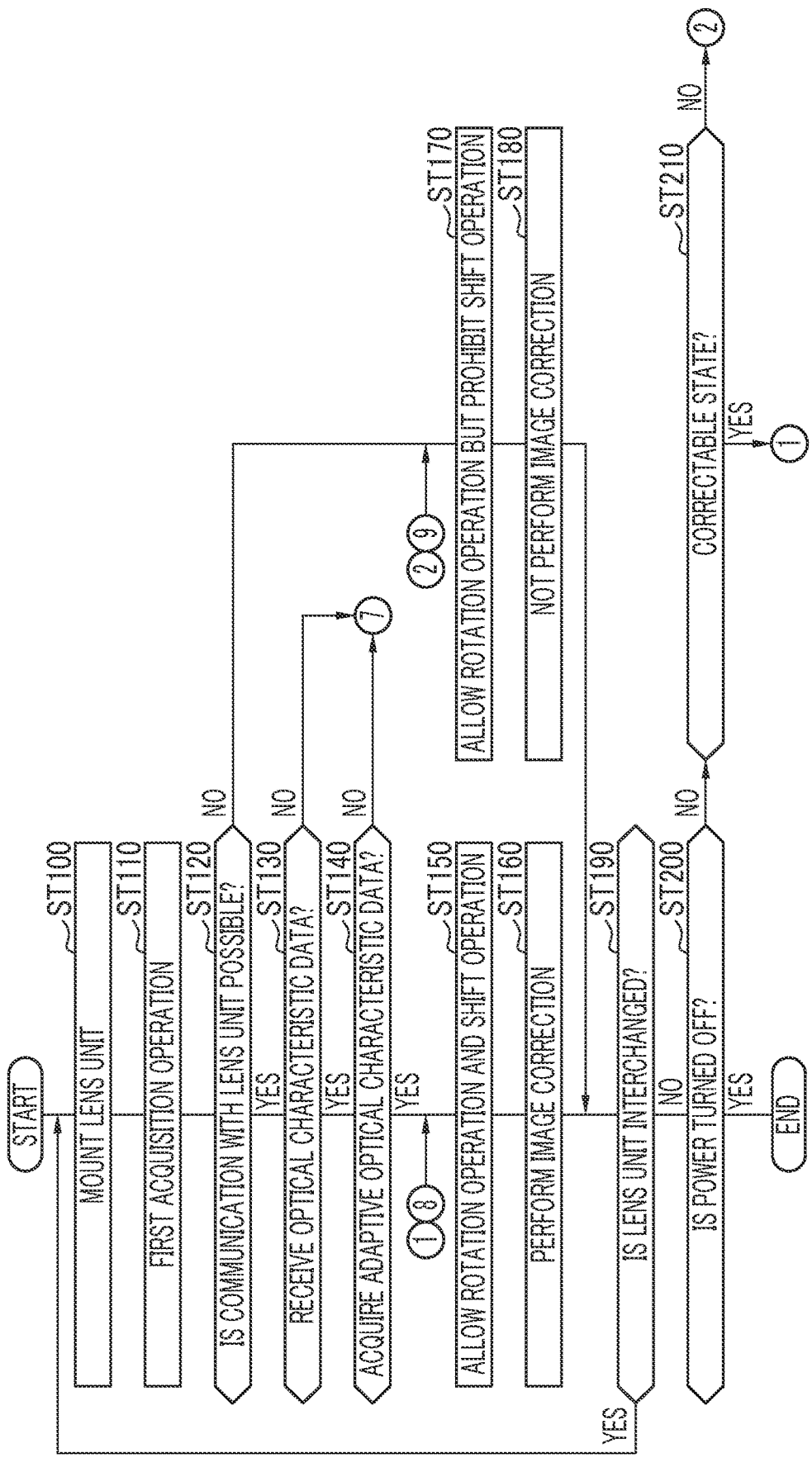
FIG. 24 is a flowchart showing the processing procedure of the lens interchangeable digital camera according to the fourth embodiment.
Figure 25:
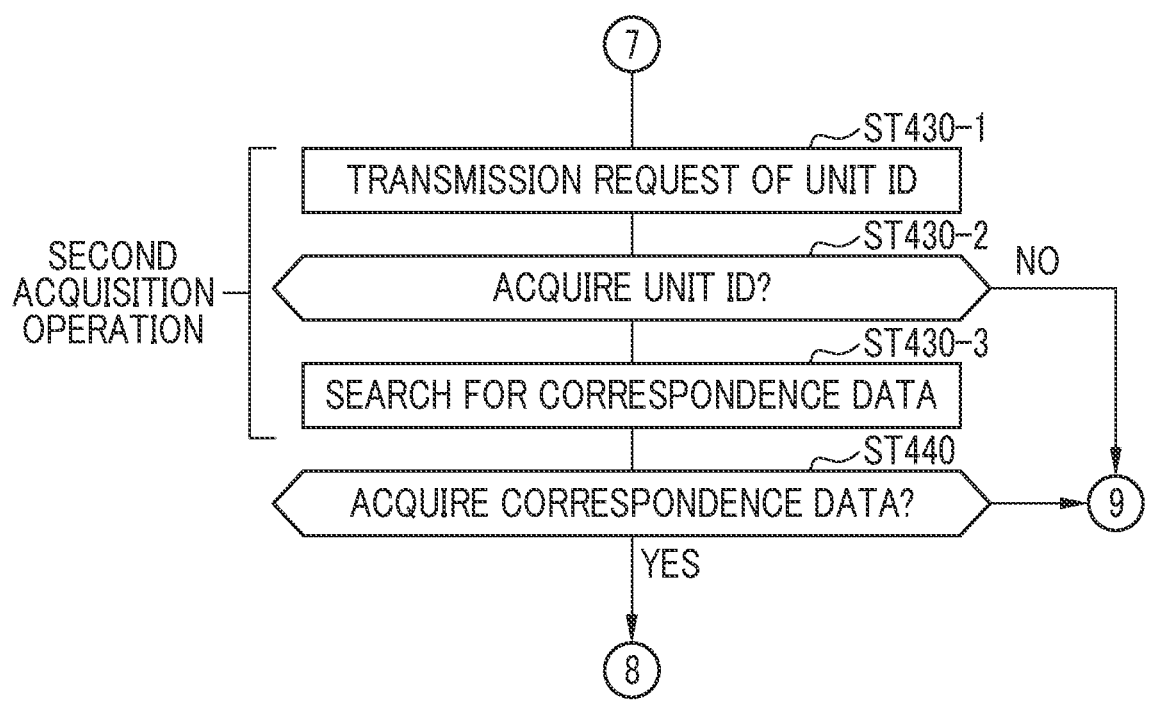
FIG. 25 is a flowchart showing the processing procedure of the lens interchangeable digital camera according to the fourth embodiment.

FIGS. 24 and 25 are flowcharts showing details of a processing procedure of the camera 10 according to the fourth embodiment. In FIG. 24, in a case where the communication control unit 70 cannot receive the optical characteristic data 50 (NO in step ST130) and in a case where the determination unit 98 determines that the optical characteristic data 50 from the characteristic data acquisition unit 96 is not the adaptive optical characteristic data (NO in step ST140), that is, in a case where the adaptive optical characteristic data cannot be acquired by the first acquisition operation, the characteristic data acquisition unit 96 performs the second acquisition operation (steps ST430-1 to ST430-3) as shown in FIG. 25.

More specifically, the characteristic data acquisition unit 96 issues the transmission request for the unit ID to the communication control unit 48 through the communication control unit 70 (step ST430-1). In a case where the unit ID corresponding to the transmission request can be acquired (YES in step ST430-2), the characteristic data acquisition unit 96 searches for the correspondence data which is the optical characteristic data 50 corresponding to the acquired unit ID from the characteristic data table 105 (step ST430-3). In a case where the correspondence data is stored in the characteristic data table 105, the correspondence data is read out and acquired from the characteristic data table 105 by the characteristic data acquisition unit 96 (YES in step ST440). In the case, the operation deciding unit 99 decides that both the rotation operation and the shift operation are allowed (step ST150, operation deciding step) as shown in FIG. 24.

On the other hand, in a case where the unit ID cannot be acquired (NO in step ST430-2) and in a case where the correspondence data cannot be acquired (NO in step ST440), the operation deciding unit 99 decides that the rotation operation is allowed but the shift operation is prohibited and restricted (step ST170, operation deciding step) as shown in FIG. 24.

The characteristic data acquisition unit 96 performs not only the first acquisition operation of storing the optical characteristic data 50 in association with the unit ID in the camera-side storage unit 74 and acquiring the optical characteristic data 50 stored in the unit-side storage unit 49, but also the second acquisition operation of acquiring the optical characteristic data 50 stored in the camera-side storage unit 74. Therefore, it is possible to expand the opportunity to acquire the adaptive optical characteristic data and conversely to reduce the opportunity to restrict the sensor movement operation.

It is possible to register relatively abundant types of optical characteristic data 50 of the lens unit 11 in the camera-side storage unit 74 at the time of manufacturing the camera 10. For this reason, in a case where optical characteristic data 50 of a relatively old lens unit 11, optical characteristic data 50 of a so-called lens unit 11 of a third party which is different from a manufacturer of the camera 10, and the like are comprehensively registered in the camera-side storage unit 74, the probability that the adaptive optical characteristic data can be acquired by the second acquisition operation and the correctable state can be realized is further increased.

Fifth Embodiment

Figure 26:
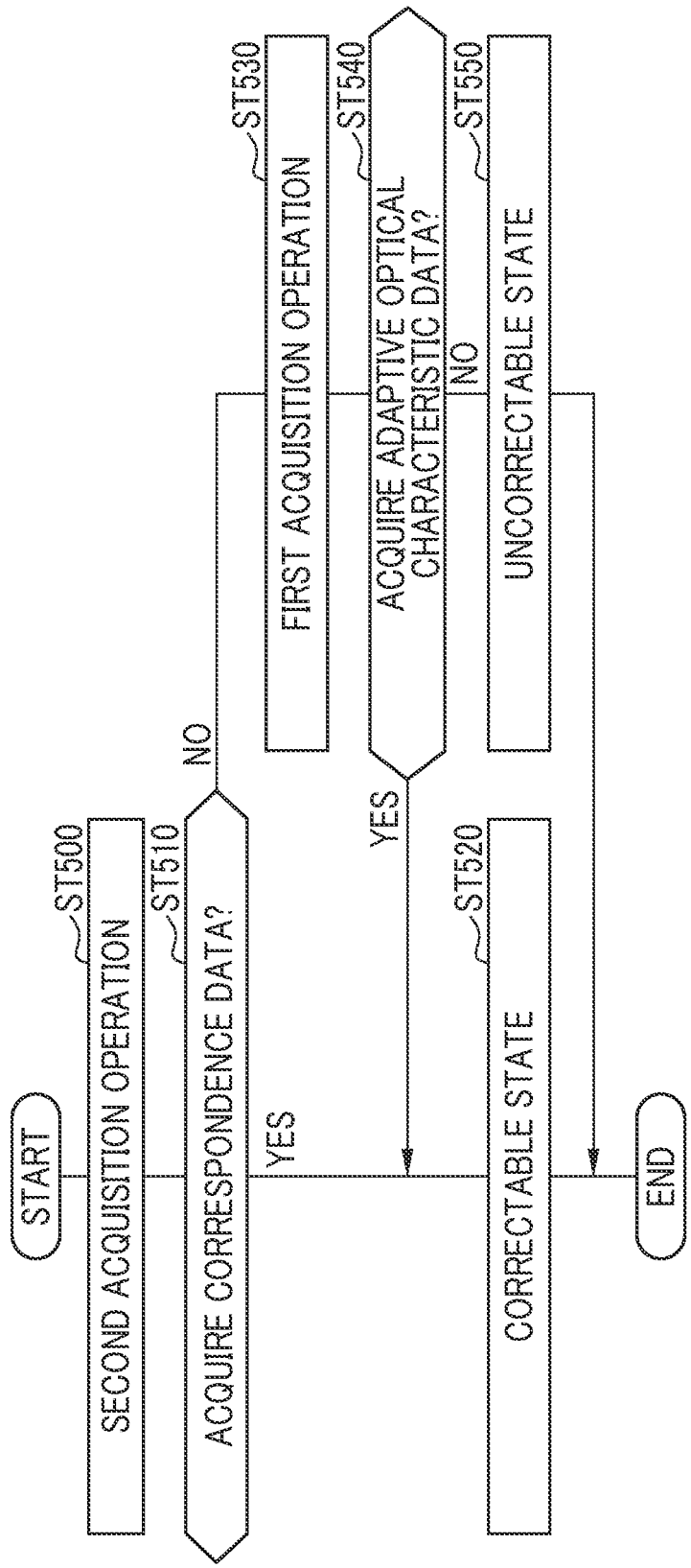
FIG. 26 is a flowchart showing a processing procedure of a lens interchangeable digital camera according to a fifth embodiment.

In a fifth embodiment shown in FIG. 26, the characteristic data acquisition unit 96 first performs the second acquisition operation contrary to the fourth embodiment.

In FIG. 26, in the fifth embodiment, the characteristic data acquisition unit 96 first performs the second acquisition operation (step ST500). In a case where the correspondence data can be acquired by the second acquisition operation (YES in step ST510), the determination result information indicating the correctable state is output from the determination unit 98 to the operation deciding unit 99 (step ST520).

On the contrary, in a case where the correspondence data cannot be acquired by the second acquisition operation (NO in step ST510), the characteristic data acquisition unit 96 performs the first acquisition operation (step ST530). In a case where the adaptive optical characteristic data can be acquired by the second acquisition operation (YES in step ST540), the determination result information indicating the correctable state is output from the determination unit 98 to the operation deciding unit 99 (step ST520) as in the case where the correspondence data can be acquired by the second acquisition operation. On the other hand, in a case where the adaptive optical characteristic data cannot be acquired by the first acquisition operation (NO in step ST540), the determination result information indicating the uncorrectable state is output from the determination unit 98 to the operation deciding unit 99 (step ST550).

The case where the correspondence data can be acquired by the second acquisition operation is a case where the correspondence data is in the camera-side storage unit 74. In the case, the characteristic data acquisition unit 96 reads out and acquires the correspondence data from the camera-side storage unit 74 regardless of whether or not the adaptive optical characteristic data is in the unit-side storage unit 49.

In the case where the correspondence data can be acquired by the second acquisition operation, it is not necessary to perform the first acquisition operation in which the communication with the lens unit 11 occurs. In a case where once the first acquisition operation is performed and the correspondence data is acquired and stored in the camera-side storage unit 74, it is possible to easily acquire the adaptive optical characteristic data by the second acquisition operation. That is, it is not necessary to perform the first acquisition operation every time the lens unit 11 is mounted. For this reason, it is possible to start imaging immediately after the lens unit 11 is mounted.

Sixth Embodiment

Figure 27:
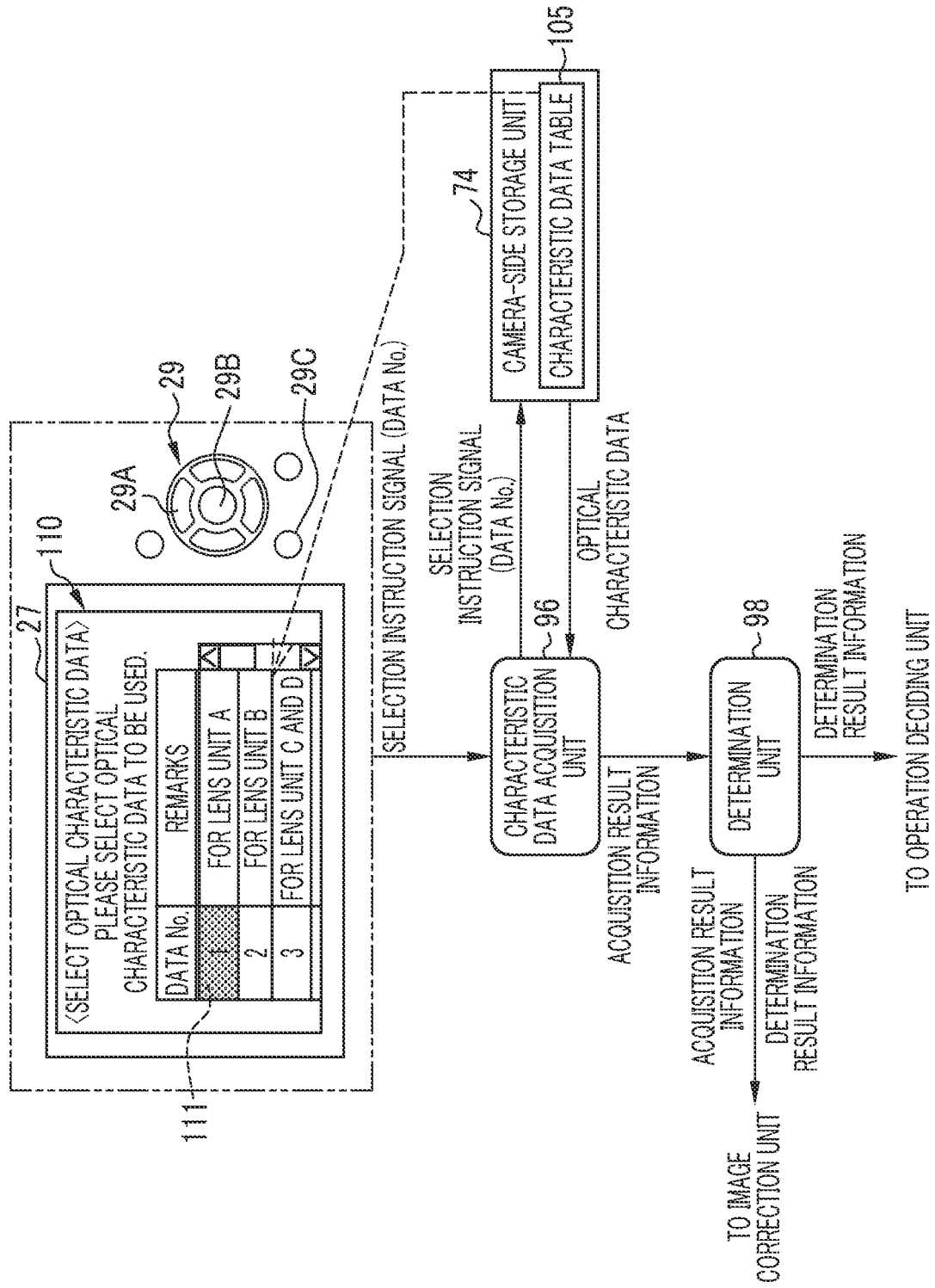
FIG. 27 is a diagram showing functions of a CPU of a lens interchangeable digital camera according to a sixth embodiment.
Figure 28:
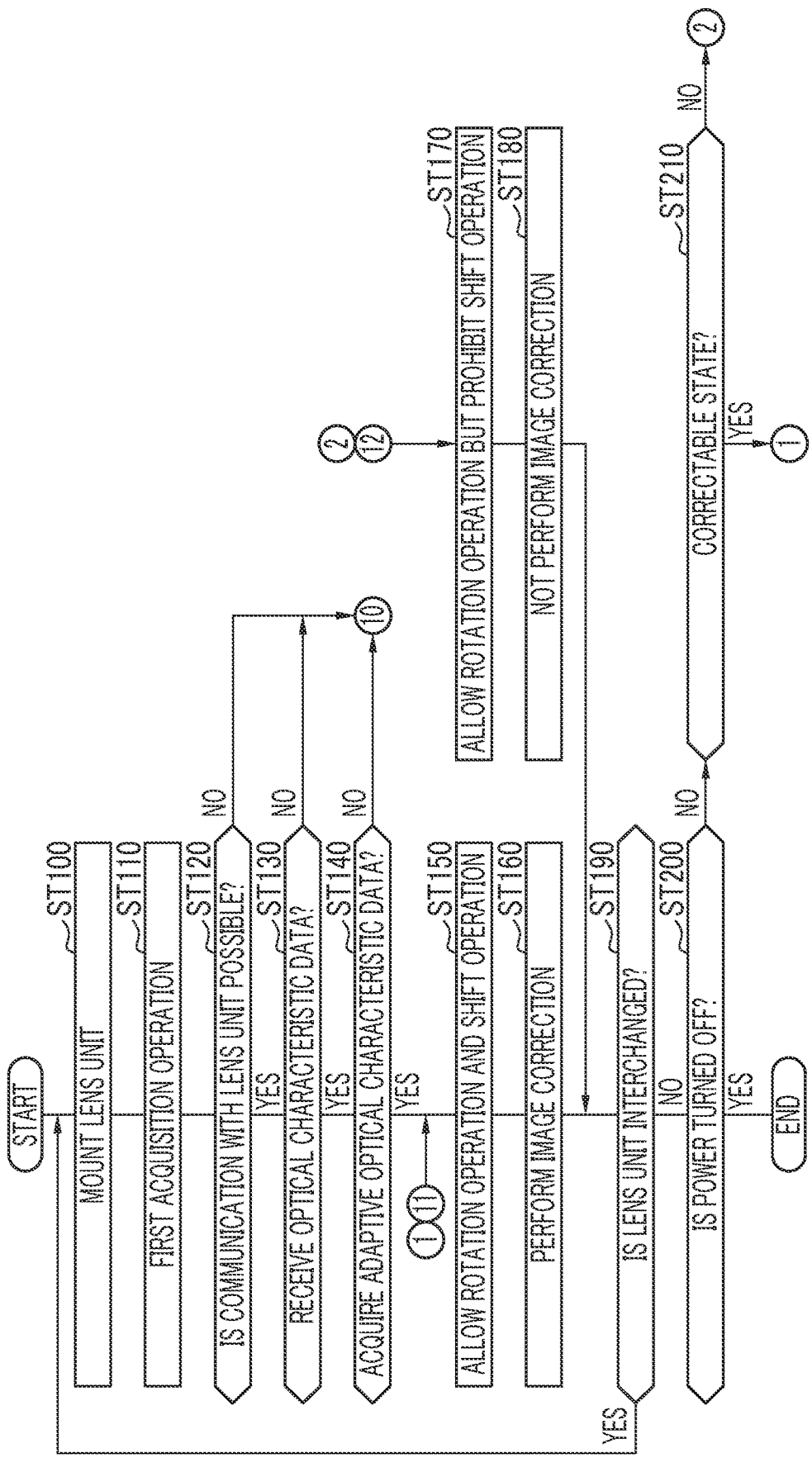
FIG. 28 is a flowchart showing a processing procedure of the lens interchangeable digital camera according to the sixth embodiment.
Figure 29:
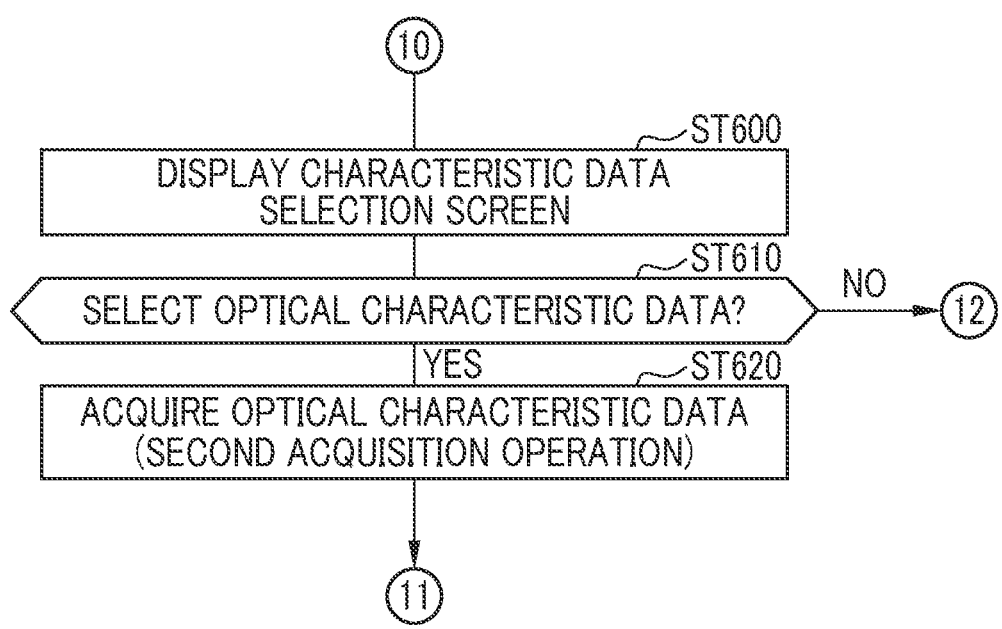
FIG. 29 is a flowchart showing the processing procedure of the lens interchangeable digital camera according to the sixth embodiment.

In a sixth embodiment shown in FIGS. 27 to 29, the user selects one piece of optical characteristic data 50 from among the pieces of optical characteristic data 50 stored in the camera-side storage unit 74, and the characteristic data acquisition unit 96 reads out and acquires the selected optical characteristic data 50 from the camera-side storage unit 74.

Hereinafter, a case where the characteristic data acquisition unit 96 first performs the first acquisition operation will be described as an example as in the fourth embodiment. Of course, the second acquisition operation (operation of reading out and acquiring the optical characteristic data 50 selected by the user from the camera-side storage unit 74) may be first performed as in the fifth embodiment.

In FIG. 27, the display control unit 72 displays a characteristic data selection screen 110 on the display unit 27 in the sixth embodiment. The display control unit 72 displays the characteristic data selection screen 110 in the case where the adaptive optical characteristic data cannot be acquired by the first acquisition operation. In the case where the second acquisition operation is first performed as in the fifth embodiment, the display control unit 72 displays the characteristic data selection screen 110 in a case where the lens unit 11 is mounted on the body mount 15.

The characteristic data selection screen 110 displays a message prompting selection of the optical characteristic data 50 to be used. Then, the data No. of the optical characteristic data 50 stored in the characteristic data table 105 is displayed as a list together with remarks indicating which lens unit 11 is used. The data No. can be alternatively selected with a cursor 111 indicated by broken-line hatching. The cursor 111 can be operated in the vertical direction with a cross key 29A of the operation key group 29, and the selection can be made with a deciding key 29B of the operation key group 29. That is, the display unit 27 and the operation key group 29 have a data selection function of causing the user to select one piece of optical characteristic data 50 from among the optical characteristic data 50 stored in the camera-side storage unit 74.

The characteristic data selection screen 110 can be deleted from the display unit 27 by pressing of a cancel key 29C of the operation key group 29. That is, it is possible for the user to end without selecting the optical characteristic data 50.

The characteristic data acquisition unit 96 receives a selection instruction signal of the optical characteristic data 50 including the data No. selected by the data selection function. Then, the optical characteristic data 50 corresponding to the data No. of the received selection instruction signal is read out and acquired from the characteristic data table 105 as the second acquisition operation.

The acquisition result information is provided with an item for registering whether or not the optical characteristic data 50 is selected by the data selection function, in addition to the items in the first embodiment. A case where the optical characteristic data 50 is not selected by the data selection function is a case where the characteristic data selection screen 110 is deleted from the display unit 27 by pressing of the cancel key 29C.

FIGS. 28 and 29 are flowcharts showing details of a processing procedure of the camera 10 according to the sixth embodiment. In FIG. 28, in the case where the communication control unit 70 cannot communicate with the lens unit 11 (NO in step ST120), in the case where the communication control unit 70 cannot receive the optical characteristic data 50 (NO in step ST130), and in the case where the received optical characteristic data 50 is not the adaptive optical characteristic data (NO in step ST140), that is, in a case where the adaptive optical characteristic data cannot be acquired by the first acquisition operation, the display control unit 72 displays the characteristic data selection screen 110 on display unit 27 (step ST600) as shown in FIG. 29.

In a case where the data No. is selected by the operation key group 29 on the characteristic data selection screen 110 and one piece of optical characteristic data 50 is selected (YES in step ST610), the characteristic data acquisition unit 96 reads out and acquires the optical characteristic data 50 corresponding to the data No. from the characteristic data table 105 as the second acquisition operation (step ST620). In the case, the operation deciding unit 99 decides that both the rotation operation and the shift operation are allowed (step ST150, operation deciding step) as shown in FIG. 28.

On the other hand, in a case where the characteristic data selection screen 110 is deleted and the data No. is selected by the user (NO in step ST610), the operation deciding unit 99 decides that the rotation operation is allowed but the shift operation is prohibited and restricted (step ST170, operation deciding step) as shown in FIG. 28. As described above, the case where the adaptive optical characteristic data cannot be acquired by the second acquisition operation includes the case where the optical characteristic data 50 is not selected by the data selection function.

According to the sixth embodiment, it is possible to expand the opportunity to acquire the adaptive optical characteristic data and conversely to reduce the opportunity to restrict the sensor movement operation as in the fourth embodiment described above.

The unit ID may be input to select the optical characteristic data 50 instead of selecting the data No.

The sixth embodiment may be performed in combination with the fourth embodiment. In the case, the mode in the fourth embodiment in which the correspondence data corresponding to the unit ID acquired from the lens unit 11 is read out and acquired from the camera-side storage unit 74 and the mode in the sixth embodiment in which the optical characteristic data 50 selected by the data selection function is read out and acquired from the camera-side storage unit 74 are configured to be selectable by the user.

In each of the embodiments described above, hardware structures of the processing units, such as the image data acquisition unit 95, the characteristic data acquisition unit 96, the image correction unit 97, the determination unit 98, and the operation deciding unit 99, that execute various pieces of processing are various processors as shown below.

The various processors include a CPU, a programmable logic device (PLD), a dedicated circuitry, and the like. The CPU is a general-purpose processor that executes software (program) to function as various processing units as well known. The PLD is a processor whose circuit configuration can be changed after manufacturing, such as a field programmable gate array (FPGA). The dedicated circuitry is a processor having a circuit configuration designed specially for executing specific processing, such as an application specific integrated circuit (ASIC).

One processing unit may be composed of one of these various processors or a combination of two or more processors having the same type or different types (for example, combination of a plurality of FPGAs, or CPU and FPGA). A plurality of processing units may be composed of one processor. As an example of composing the plurality of processing units with one processor, first, there is a form in which one processor is composed of a combination of one or more CPUs and software and the processor functions as the plurality of processing units. Second, there is a form of using a processor realizing the functions of the entire system including the plurality of processing units with one IC chip, as represented by a system on chip (SoC) or the like. As described above, the various processing units are composed of one or more of the various processors described above as the hardware structure.

Further, the hardware structure of these various processors is, more specifically, a circuitry combining circuit elements such as a semiconductor element.

From the above description, it is possible to grasp the lens interchangeable digital camera according to additional item 1 below.

[Additional Item 1]

In a lens interchangeable digital camera comprising an image sensor that outputs image data of a subject, a sensor movement type shake correction mechanism that performs a sensor movement operation of moving the image sensor in a direction to cancel a shake, a body mount in which a plurality of types of lens units with built-in imaging optical systems for forming a subject image on an imaging surface of the image sensor are interchangeably mounted, the lens interchangeable digital camera comprises an acquisition processor that acquires optical characteristic data corresponding to optical characteristics of the imaging optical system of the lens unit mounted in the body mount, an image correction processor that performs image correction on the image data based on the optical characteristic data, a determination processor that determines whether or not the acquisition processor is able to acquire adaptive optical characteristic data that is the optical characteristic data and is able to be handled by the image correction processor, and an operation deciding processor that decides an operation of the shake correction mechanism according to a determination result of the determination processor and restricts at least a part of the sensor movement operation allowed in an uncorrectable state where the image correction based on the adaptive optical characteristic data is not possible since the acquisition processor is not able to acquire the adaptive optical characteristic data and in a correctable state where the image correction based on the adaptive optical characteristic data is possible.

Needless to say, the present invention is not limited to each embodiment described above, and various configurations may be employed without departing from the gist of the present invention.

EXPLANATION OF REFERENCES

10: lens interchangeable digital camera (camera)
11, 11A-11E: lens unit
15: body mount
16, 16A-16E: engaging portion
17, 18: signal contact
19: image sensor
20: Imaging surface
21: power lever
22: release switch
23: exposure correction dial
24: shutter speed/ISO sensitivity dial
25: hot shoe
27: display unit
28: optical viewfinder 29: operation key group
29A: cross key
29B: deciding key
29C: cancel key
30: lid
35: imaging optical system
36: focus ring
37: zoom ring
38: iris ring
45A, 45D: lens
45B: focus lens
45C: zoom lens
46: stop mechanism
47: optical system control unit
48: communication control unit
49: unit-side storage unit
50, 50A to 50D: optical characteristic data
55, 55A-55D: edge part dimming data
56, 56A-56D: distortion data
57, 57A-57C: resolution data
58, 58A-58C: pupil shape data
65: shake correction mechanism
66: analog front end (AFE)
67: digital signal processor (DSP)
68: sensor control unit
69: central processing unit (CPU)
70: communication control unit
71: frame memory
72: display control unit
73: card control unit
74: camera-side storage unit
75: data bus
76: operation program
77: memory card
85: gyro sensor
86: shake correction control unit
87: position detection sensor
88: actuator
95: image data acquisition unit
96: characteristic data acquisition unit (acquisition unit)
97: image correction unit
98: determination unit
99: operation deciding unit
105: characteristic data table
110: characteristic data selection screen
111: cursor
OA: optical axis
OC: optical center
IC: image center
X: axis along long side of imaging surface
Y: axis along short side of imaging surface
RO: arrow indicating rotation operation
ST100 to ST210, ST250 to ST280, ST300 to ST320, ST400 to ST450, ST430-1 to ST430-3, ST500 to ST550, ST600 to ST620: step

What is claimed is:

1. A lens interchangeable digital camera comprising:
an image sensor that outputs image data of a subject;
a shake correction mechanism that performs a sensor movement operation of moving the image sensor, and has a first shake correction mode that always allows the sensor movement operation and a second shake correction mode that allows the sensor movement operation only during an imaging operation in response to a release operation;
an input unit configured to selectively input the first shake correction mode or the second shake correction mode;
a body mount on which a lens unit is interchangeably mounted; and
a processor configured to:
determine whether or not adaptive optical characteristic data that is optical characteristic data corresponding to optical characteristics of the lens unit mounted on the body mount can be acquired to be subjected to image correction; and
in a case where the first shake correction mode has been selectively input and it is determined that the adaptive optical characteristic data cannot be acquired, switch a mode of the shake correction mechanism to the second shake correction mode.

2. The lens interchangeable digital camera according to claim 1,
wherein, in the second shake correction mode, at least a part of the sensor movement operation allowed in the first shake correction mode is restricted.

3. The lens interchangeable digital camera according to claim 1,
wherein the sensor movement operation includes a plurality of types of sensor movement operations having different movement directions of the image sensor, and
wherein, in the second shake correction mode, at least one of the plurality of types of sensor movement operations is restricted when not during the imaging operation.

4. The lens interchangeable digital camera according to claim 3,
wherein the plurality of types of sensor movement operations include a rotation operation of rotationally moving the image sensor in a state where an optical center which is a point through which an optical axis of an imaging optical system of the lens unit passes matches an image center which is a center point of an imaging surface of the image sensor, and a shift operation of moving the image sensor in parallel with a plane perpendicular to the optical axis, and
wherein, in the second shake correction mode, at least the shift operation is restricted when not during the imaging operation.

5. The lens interchangeable digital camera according to claim 4,
wherein, in the first shake correction mode, the rotation operation is allowed regardless of whether or not the adaptive optical characteristic data can be acquired.

6. The lens interchangeable digital camera according to claim 3,
wherein the plurality of types of sensor movement operations include a restricted-range movement operation in which a movable range of the image sensor is restricted as compared with a movable range in a case where the adaptive optical characteristic data is acquired.

7. The lens interchangeable digital camera according to claim 1, further comprising a display unit, and having a live view display function of displaying a captured image of the subject represented by the image data on the display unit,
wherein, in the second shake correction mode, the sensor movement operation is restricted while the live view display function is in operation, and the restriction of the sensor movement operation is released during the imaging operation.

8. The lens interchangeable digital camera according to claim 7,
wherein, upon the switching to the second shake correction mode, the processor displays a notification on the display unit.

9. The lens interchangeable digital camera according to claim 7,
wherein the sensor movement operation is prohibited in the second shake correction mode, and
wherein, upon the switching to the second shake correction mode, the processor displays the prohibition of the sensor movement operation on the display unit.

10. The lens interchangeable digital camera according to claim 1,
wherein the imaging operation is a video imaging operation.

11. The lens interchangeable digital camera according to claim 1, having a video imaging function of imaging a video of the subject,
wherein, in the second shake correction mode, the sensor movement operation is restricted while the video imaging function is in operation, and the restriction of the sensor movement operation is released while the video imaging function is not in operation.

12. The lens interchangeable digital camera according to claim 1,
wherein the processor performs at least one operation of a first acquisition operation of acquiring the optical characteristic data stored in a unit-side storage unit in the lens unit mounted on the body mount, or a second acquisition operation of acquiring the optical characteristic data stored in a camera-side storage unit in a camera body.

13. The lens interchangeable digital camera according to claim 12,
wherein the camera-side storage unit stores the optical characteristic data in association with identification information for identifying the lens unit, and
wherein the second acquisition operation is an operation of acquiring the identification information from the lens unit mounted on the body mount, and reading out and acquiring correspondence data which is the optical characteristic data corresponding to the acquired identification information from the camera-side storage unit.

14. The lens interchangeable digital camera according to claim 12,
wherein the lens interchangeable digital camera has a data selection function of causing the user to select one piece of optical characteristic data from among the pieces of optical characteristic data stored in the camera-side storage unit, and
wherein the second acquisition operation is an operation of reading out and acquiring the optical characteristic data selected by the data selection function from the camera-side storage unit.

15. An operation method of a lens interchangeable digital camera including an image sensor that outputs image data of a subject, a processor, a shake correction mechanism that performs a sensor movement operation of moving the image sensor and has a first shake correction mode that always allows the sensor movement operation and a second shake correction mode that allows the sensor movement operation only during an imaging operation in response to a release operation, an input unit configured to selectively input the first shake correction mode or the second shake correction mode, and a body mount on which a lens unit is interchangeably mounted, the method comprising:
a step of determining whether or not adaptive optical characteristic data that is optical characteristic data corresponding to optical characteristics of the lens unit mounted on the body mount can be acquired to be subjected to image correction; and
a step of switching a mode of the shake correction mechanism to the second shake correction mode in a case where the first shake correction mode has been selectively input and it is determined that the adaptive optical characteristic data cannot be acquired.

16. A non-transitory computer readable medium for storing a computer-executable program for a lens interchangeable digital camera including an image sensor that outputs image data of a subject, a processor, a shake correction mechanism that performs a sensor movement operation of moving the image sensor and has a first shake correction mode that always allows the sensor movement operation and a second shake correction mode that allows the sensor movement operation only during an imaging operation in response to a release operation, an input unit configured to selectively input the first shake correction mode or the second shake correction mode, and a body mount on which a lens unit is interchangeably mounted, the computer-executable program causing a computer to execute:
a determining function that determines whether or not adaptive optical characteristic data that is optical characteristic data corresponding to optical characteristics of the lens unit mounted on the body mount can be acquired to be subjected to image correction; and
a switching function that switches a mode of the shake correction mechanism to the second shake correction mode in a case where the first shake correction mode has been selectively input and it is determined that the adaptive optical characteristic data cannot be acquired.

* * * * *